(12) United States Patent
Nakamori

(10) Patent No.: US 11,494,354 B2
(45) Date of Patent: Nov. 8, 2022

(54) INFORMATION MANAGEMENT APPARATUS, INFORMATION PROCESSING APPARATUS, AND NON-TRANSITORY COMPUTER READABLE MEDIUM

(71) Applicant: FUJIFILM BUSINESS INNOVATION CORP., Tokyo (JP)

(72) Inventor: Yuta Nakamori, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 144 days.

(21) Appl. No.: 16/871,634

(22) Filed: May 11, 2020

(65) Prior Publication Data

US 2021/0141777 A1    May 13, 2021

(30) Foreign Application Priority Data

Nov. 8, 2019   (JP) .............................. JP2019-203056

(51) Int. Cl.
```
G06F 17/30      (2006.01)
G06F 16/22      (2019.01)
G06F 16/28      (2019.01)
G06F 16/242     (2019.01)
```
(52) U.S. Cl.
CPC ........ *G06F 16/2246* (2019.01); *G06F 16/243* (2019.01); *G06F 16/284* (2019.01)

(58) Field of Classification Search
CPC .......... G06F 16/13; G06F 16/21; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 6,321,198 B1 | 11/2001 | Hank et al. | |
| 7,779,079 B2 | 8/2010 | Nichols et al. | |
| 8,983,962 B2 | 3/2015 | Nakazawa et al. | |
| 10,530,718 B2 | 1/2020 | Denoue et al. | |
| 2015/0112998 A1* | 4/2015 | Shankar ............. | G06F 16/2455 707/798 |
| 2015/0254214 A1* | 9/2015 | Rosenberg ............... | G09B 7/08 715/202 |
| 2018/0039760 A1* | 2/2018 | Armbruster ............ | G16H 10/20 |
| 2019/0394150 A1 | 12/2019 | Denoue et al. | |
| 2021/0042708 A1* | 2/2021 | Gardiner ................ | G06Q 10/02 |

FOREIGN PATENT DOCUMENTS

| | | | |
|---|---|---|---|
| JP | H6-282435 A | 10/1994 | |
| JP | 2001243349 A | 9/2001 | |
| JP | 2002-73662 A | 3/2002 | |
| JP | 2002-358304 A | 12/2002 | |

(Continued)

*Primary Examiner* — Hung D Le
(74) *Attorney, Agent, or Firm* — Oliff PLC

(57) ABSTRACT

An information management apparatus includes a processor configured to associate components including questions and answers to the questions using parent-child relationships and control a display of the components as a tree structure, receive a selection of a subset of components in the tree structure according to a user operation and also connect the selected subset of components to the tree structure, and change the parent-child relationships of the components according to the connection of the components.

12 Claims, 33 Drawing Sheets

(56)  References Cited

FOREIGN PATENT DOCUMENTS

| | | | |
|---|---|---|---|
| JP | 2002-543445 | A | 12/2002 |
| JP | 2006-215753 | A | 8/2006 |
| JP | 2008-52449 | A | 3/2008 |
| JP | 1768081 | B2 | 9/2011 |
| JP | 1924950 | B2 | 4/2012 |
| JP | 2018-142054 | A | 9/2018 |
| JP | 2019-28783 | A | 2/2019 |
| JP | 2019-28983 | A | 2/2019 |
| JP | 5502965 | B2 | 4/2019 |
| WO | 2016/104736 | A1 | 6/2016 |

* cited by examiner

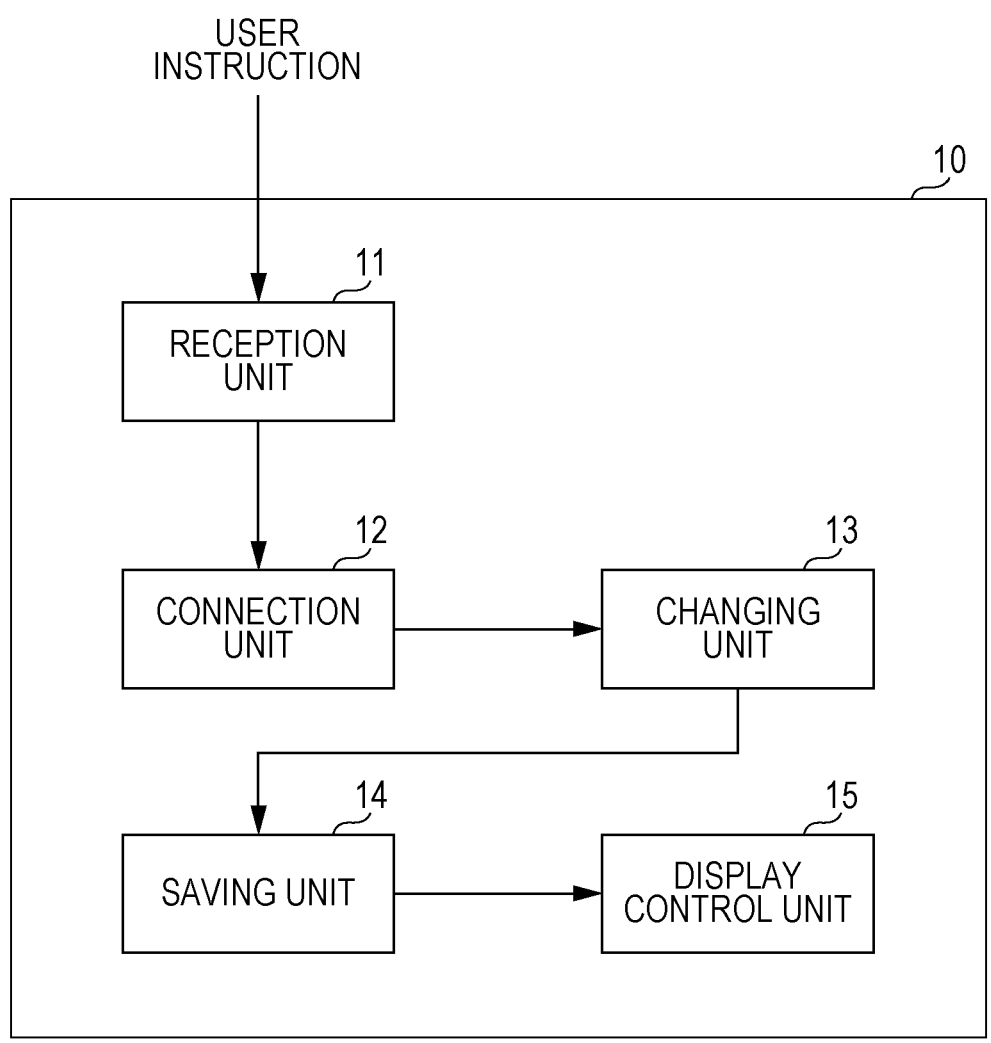

| No. | QUESTION | ANSWER | PARENT | CHILD |
|---|---|---|---|---|
| 1 | MIGRATE FROM EXISTING CONTRACT | aaaa | null | 2, 3 |
| 2 | INHERIT EXISTING CUSTOMER TENANTS INTO SERVICE | bbbb | 1 | null |
| 3 | DO NOT INHERIT EXISTING CUSTOMER TENANTS INTO SERVICE | cccc | 1 | null |
| 4 | GLOSSARY | dddd | null | 5, 6, 7 |
| 5 | WHAT IS PRIOR APPROVAL? | eeee | 4 | null |
| 6 | WHAT IS SYNDICATION? | ffff | 4 | null |
| 7 | WHAT IS A TENANT? | gggg | 4 | null |

| No. | QUESTION | ANSWER | PARENT | CHILD |
|---|---|---|---|---|
| 1 | MIGRATE FROM EXISTING CONTRACT | aaaa | null | 2, 3 |
| 2 | INHERIT EXISTING CUSTOMER TENANTS INTO SERVICE | bbbb | 1 | 5, 6, 7 |
| 3 | DO NOT INHERIT EXISTING CUSTOMER TENANTS INTO SERVICE | cccc | 1 | null |
| 4 | GLOSSARY | dddd | null | 5, 6, 7 |
| 5 | WHAT IS PRIOR APPROVAL? | eeee | 4, 2 | null |
| 6 | WHAT IS SYNDICATION? | ffff | 4, 2 | null |
| 7 | WHAT IS A TENANT? | gggg | 4, 2 | null |

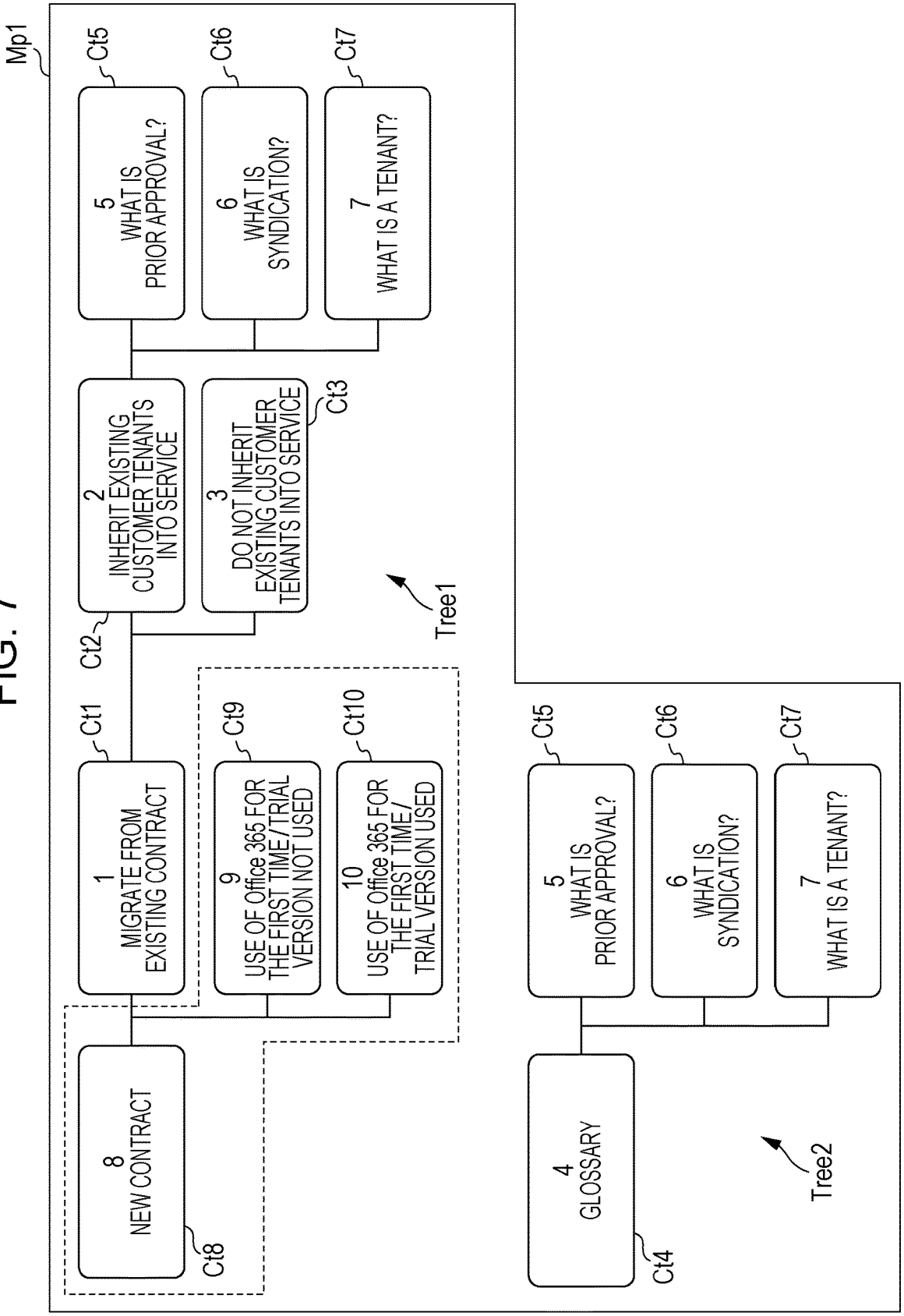

FIG. 8

| No. | QUESTION | ANSWER | PARENT | CHILD |
|---|---|---|---|---|
| 1 | MIGRATE FROM EXISTING CONTRACT | aaaa | 8 | 2, 3 |
| 2 | INHERIT EXISTING CUSTOMER TENANTS INTO SERVICE | bbbb | 1 | 5, 6, 7 |
| 3 | DO NOT INHERIT EXISTING CUSTOMER TENANTS INTO SERVICE | cccc | 1 | null |
| 4 | GLOSSARY | dddd | null | 5, 6, 7 |
| 5 | WHAT IS PRIOR APPROVAL? | eeee | 4, 2 | null |
| 6 | WHAT IS SYNDICATION? | ffff | 4, 2 | null |
| 7 | WHAT IS A TENANT? | gggg | 4, 2 | null |
| 8 | NEW CONTRACT | hhhh | null | 1, 9, 10 |
| 9 | USE OF Office 365 FOR THE FIRST TIME/TRIAL VERSION NOT USED | iiii | 8 | null |
| 10 | USE OF Office 365 FOR THE FIRST TIME/TRIAL VERSION USED | jjjj | 8 | null |

| No. | QUESTION | ANSWER | PARENT | CHILD |
|---|---|---|---|---|
| 1 | MIGRATE FROM EXISTING CONTRACT | aaaa | 8 | 2, 3 |
| 2 | INHERIT EXISTING CUSTOMER TENANTS INTO SERVICE | bbbb | 1 | 5, 6, 7 |
| 3 | DO NOT INHERIT EXISTING CUSTOMER TENANTS INTO SERVICE | cccc | 1 | null |
| 4 | GLOSSARY | dddd | null | 5, 6, 7 |
| 5 | WHAT IS PRIOR APPROVAL? | eeee | 4, 2 | 7 |
| 6 | WHAT IS SYNDICATION? | ffff | 4, 2 | null |
| 7 | WHAT IS A TENANT? | gggg | 4, 2, 5 | null |
| 8 | NEW CONTRACT | hhhh | null | 1, 9, 10 |
| 9 | USE OF Office 365 FOR THE FIRST TIME/TRIAL VERSION NOT USED | iiii | 8 | null |
| 10 | USE OF Office 365 FOR THE FIRST TIME/TRIAL VERSION USED | jjjj | 8 | null |

| No. | QUESTION | ANSWER | PARENT | CHILD |
|---|---|---|---|---|
| 1 | MIGRATE FROM EXISTING CONTRACT | aaaa | null | 2, 3 |
| 2 | INHERIT EXISTING CUSTOMER TENANTS INTO SERVICE | bbbb | 1 | null |
| 3 | DO NOT INHERIT EXISTING CUSTOMER TENANTS INTO SERVICE | cccc | 1 | null |
| 4 | GLOSSARY | dddd | null | 5, 6 |
| 5 | WHAT IS PRIOR APPROVAL? | eeee | 4 | 7 |
| 6 | WHAT IS SYNDICATION? | ffff | 4 | null |
| 7 | WHAT IS A TENANT? | gggg | 5 | null |

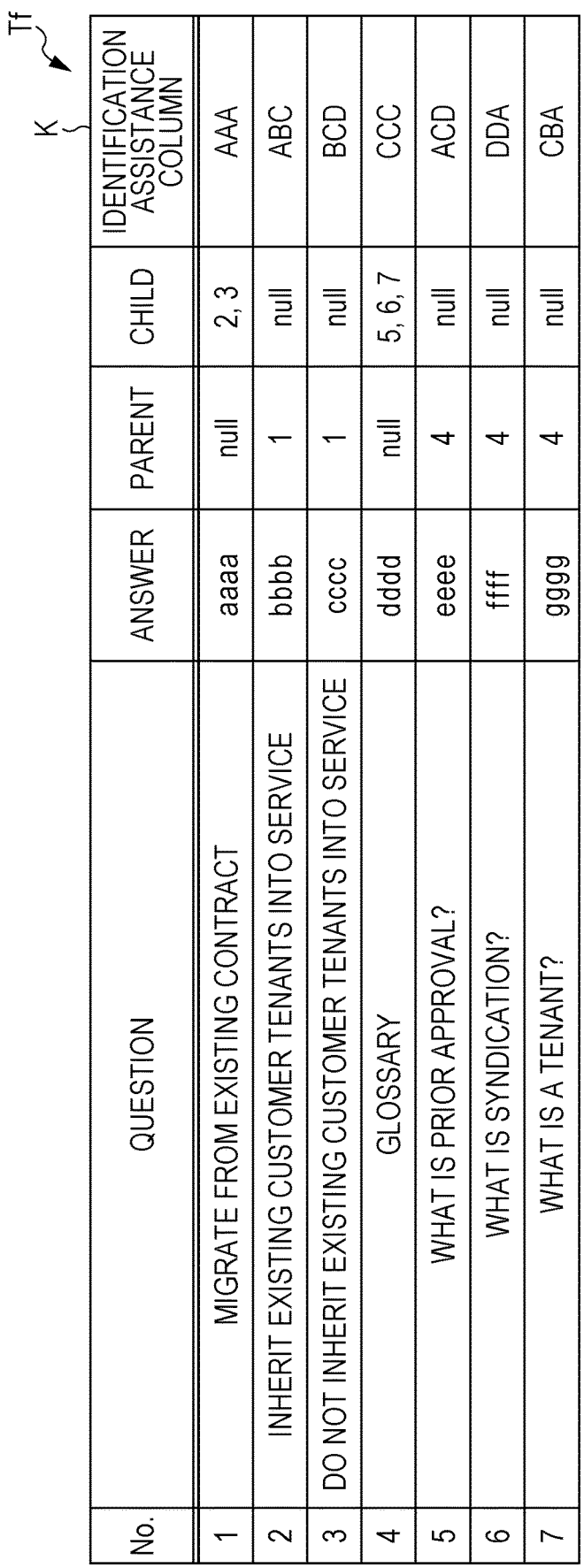

| No. | QUESTION | ANSWER | PARENT | CHILD | IDENTIFICATION ASSISTANCE COLUMN |
|---|---|---|---|---|---|
| 1 | MIGRATE FROM EXISTING CONTRACT | aaaa | null | 2, 3 | AAA |
| 2 | INHERIT EXISTING CUSTOMER TENANTS INTO SERVICE | bbbb | 1 | null | ABC |
| 3 | DO NOT INHERIT EXISTING CUSTOMER TENANTS INTO SERVICE | cccc | 1 | null | BCD |
| 4 | GLOSSARY | dddd | null | 5, 6, 7 | CCC |
| 5 | WHAT IS PRIOR APPROVAL? | eeee | 4 | null | ACD |
| 6 | WHAT IS SYNDICATION? | ffff | 4 | null | DDA |
| 7 | WHAT IS A TENANT? | gggg | 4 | null | CBA |

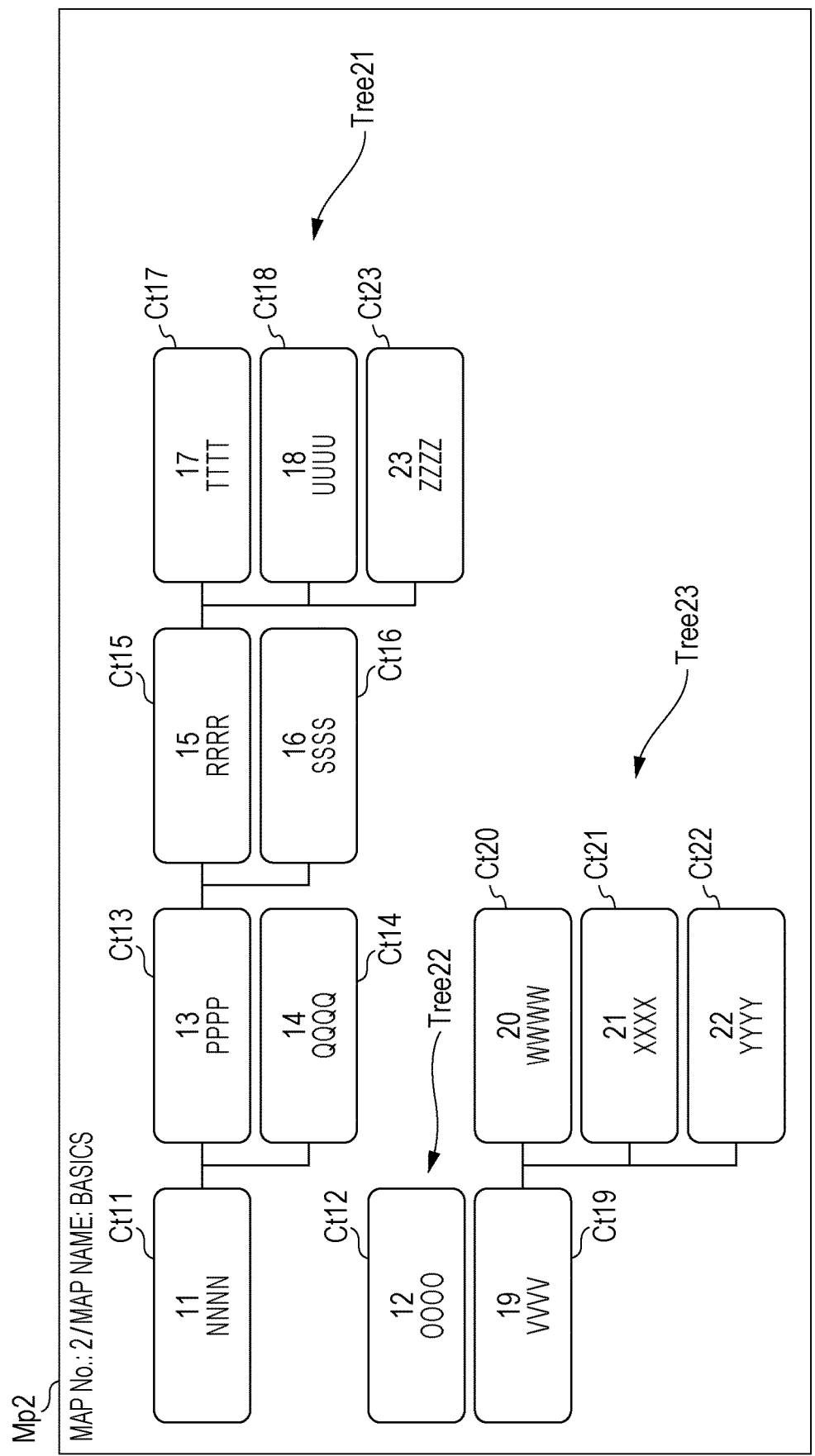

FIG. 20

| No. | QUESTION | ANSWER | PARENT | CHILD | MAP No. | MAP NAME |
|---|---|---|---|---|---|---|
| 1 | MIGRATE FROM EXISTING CONTRACT | aaaa | 8 | 2, 3 | 1 | OFFICE ANSHIN 365 |
| 2 | INHERIT EXISTING CUSTOMER TENANTS INTO SERVICE | bbbb | 1 | 5, 6, 7 | 1 | OFFICE ANSHIN 365 |
| 3 | DO NOT INHERIT EXISTING CUSTOMER TENANTS INTO SERVICE | cccc | 1 | null | 1 | OFFICE ANSHIN 365 |
| 4 | GLOSSARY | dddd | 14 | 5, 6, 7 | 1 | OFFICE ANSHIN 365 |
| 5 | WHAT IS PRIOR APPROVAL? | eeee | 4, 2 | 7 | 1 | OFFICE ANSHIN 365 |
| 6 | WHAT IS SYNDICATION? | ffff | 4, 2 | null | 1 | OFFICE ANSHIN 365 |
| 7 | WHAT IS A TENANT? | gggg | 4, 2 | null | 1 | OFFICE ANSHIN 365 |
| 8 | NEW CONTRACT | hhhh | 11 | 1, 9, 10 | 1 | OFFICE ANSHIN 365 |
| 9 | USE OF Office 365 FOR THE FIRST TIME / TRIAL VERSION NOT USED | iiii | 8 | null | 1 | OFFICE ANSHIN 365 |
| 10 | USE OF Office 365 FOR THE FIRST TIME / TRIAL VERSION USED | jjjj | 8 | null | 1 | OFFICE ANSHIN 365 |
| 11 | NNNNN | nnnn | null | 13, 14 | 2 | BASICS |
| 12 | OOOOO | oooo | null | null | 2 | BASICS |
| 13 | PPPPP | pppp | 11 | 15, 16, 23 | 2 | BASICS |
| 14 | QQQQQ | qqqq | 11 | null | 2 | BASICS |
| 15 | RRRRR | rrrr | 13 | 17, 18 | 2 | BASICS |
| 16 | SSSSS | ssss | 13 | null | 2 | BASICS |
| 17 | TTTTT | tttt | 15 | null | 2 | BASICS |
| 18 | UUUUU | uuuu | 15 | null | 2 | BASICS |
| 19 | VVVVV | vvvv | null | 20, 21, 22 | 2 | BASICS |
| 20 | WWWWW | wwww | 19 | null | 2 | BASICS |
| 21 | XXXXX | xxxx | 19 | null | 2 | BASICS |
| 22 | YYYYY | yyyy | 19 | null | 2 | BASICS |
| 23 | ZZZZZ | zzzz | 15 | null | 2 | BASICS |

FIG. 21A

| No. | QUESTION | ANSWER | PARENT | CHILD | MAP No. | MAP NAME |
|---|---|---|---|---|---|---|
| 1 | MIGRATE FROM EXISTING CONTRACT | aaaa | 8 | 2, 3 | 1 | OFFICE ANSHIN 365 |
| 2 | INHERIT EXISTING CUSTOMER TENANTS INTO SERVICE | bbbb | 1 | 5, 6, 7 | 1 | OFFICE ANSHIN 365 |
| 3 | DO NOT INHERIT EXISTING CUSTOMER TENANTS INTO SERVICE | cccc | 1 | null | 1 | OFFICE ANSHIN 365 |
| 4 | GLOSSARY | dddd | 14 | 5, 6, 7 | 1 | OFFICE ANSHIN 365 |
| 5 | WHAT IS PRIOR APPROVAL? | eeee | 4, 2 | 7 | 1 | OFFICE ANSHIN 365 |
| 6 | WHAT IS SYNDICATION? | ffff | 4, 2 | null | 1 | OFFICE ANSHIN 365 |
| 7 | WHAT IS A TENANT? | gggg | 4, 2 | null | 1 | OFFICE ANSHIN 365 |
| 8 | NEW CONTRACT | hhhh | 11 | 1, 9, 10 | 1 | OFFICE ANSHIN 365 |
| 9 | USE OF Office 365 FOR THE FIRST TIME/TRIAL VERSION NOT USED | iiii | 8 | null | 1 | OFFICE ANSHIN 365 |
| 10 | USE OF Office 365 FOR THE FIRST TIME/TRIAL VERSION USED | jjjj | 8 | null | 1 | OFFICE ANSHIN 365 |

FIG. 21B

| No. | QUESTION | ANSWER | PARENT | CHILD | MAP No. | MAP NAME |
|---|---|---|---|---|---|---|
| 11 | NNNNN | nnnn | null | 13, 14 | 2 | BASICS |
| 12 | OOOOO | oooo | null | null | 2 | BASICS |
| 13 | PPPPP | pppp | 11 | 15, 16, 23 | 2 | BASICS |
| 14 | QQQQQ | qqqq | 11 | null | 2 | BASICS |
| 15 | RRRRR | rrrr | 13 | 17, 18 | 2 | BASICS |
| 16 | SSSSS | ssss | 13 | null | 2 | BASICS |
| 17 | TTTTT | tttt | 15 | null | 2 | BASICS |
| 18 | UUUUU | uuuu | 15 | null | 2 | BASICS |
| 19 | VVVVV | vvvv | null | 20, 21, 22 | 2 | BASICS |
| 20 | WWWWW | wwww | 19 | null | 2 | BASICS |
| 21 | XXXXX | xxxx | 19 | null | 2 | BASICS |
| 22 | YYYYY | yyyy | 19 | null | 2 | BASICS |
| 23 | ZZZZZ | zzzz | 15 | null | 2 | BASICS |

Ti

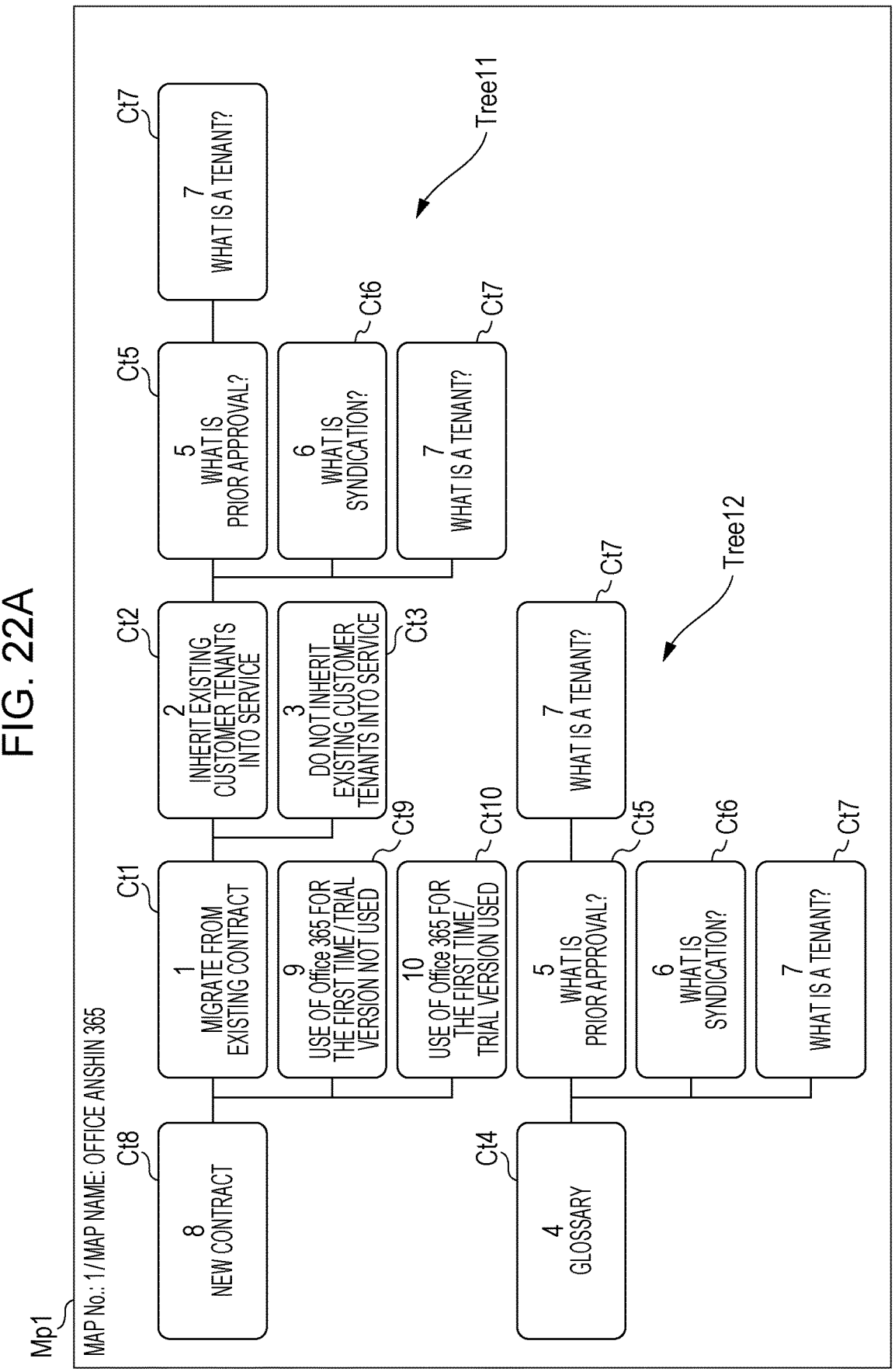

FIG. 23

| No. | QUESTION | ANSWER | PARENT | CHILD | MAP No. | MAP NAME |
|---|---|---|---|---|---|---|
| 1 | MIGRATE FROM EXISTING CONTRACT | aaaa | 8 | 2, 3 | 1 | OFFICE ANSHIN 365 |
| 2 | INHERIT EXISTING CUSTOMER TENANTS INTO SERVICE | bbbb | 1 | 5, 6, 7 | 1 | OFFICE ANSHIN 365 |
| 3 | DO NOT INHERIT EXISTING CUSTOMER TENANTS INTO SERVICE | cccc | 1 | null | 1 | OFFICE ANSHIN 365 |
| 4 | GLOSSARY | dddd | 14 | 5, 6, 7 | 1 | OFFICE ANSHIN 365 |
| 5 | WHAT IS PRIOR APPROVAL? | eeee | 4, 2, 17 | 7 | 1, 2 | OFFICE ANSHIN 365 |
| 6 | WHAT IS SYNDICATION? | ffff | 4, 2, 17 | null | 1, 2 | OFFICE ANSHIN 365 |
| 7 | WHAT IS A TENANT? | gggg | 4, 2 | null | 1 | OFFICE ANSHIN 365 |
| 8 | NEW CONTRACT | hhhh | 11 | 1, 9, 10 | 1 | OFFICE ANSHIN 365 |
| 9 | USE OF Office 365 FOR THE FIRST TIME / TRIAL VERSION NOT USED | iiii | 8 | null | 1 | OFFICE ANSHIN 365 |
| 10 | USE OF Office 365 FOR THE FIRST TIME / TRIAL VERSION USED | jjjj | 8 | null | 1 | OFFICE ANSHIN 365 |
| 11 | NNNNN | nnnn | null | 13, 14 | 2 | BASICS |
| 12 | OOOOO | oooo | null | null | 2 | BASICS |
| 13 | PPPPP | pppp | 11 | 15, 16, 23 | 2 | BASICS |
| 14 | QQQQQ | qqqq | 11 | null | 2 | BASICS |
| 15 | RRRRR | rrrr | 13 | 17, 18 | 2 | BASICS |
| 16 | SSSSS | ssss | 13 | null | 2 | BASICS |
| 17 | TTTTT | tttt | 15 | 5, 6 | 2 | BASICS |
| 18 | UUUUU | uuuu | 15 | null | 2 | BASICS |
| 19 | VVVVV | vvvv | null | 20, 21, 22 | 2 | BASICS |
| 20 | WWWWW | wwww | 19 | null | 2 | BASICS |
| 21 | XXXXX | xxxx | 19 | null | 2 | BASICS |
| 22 | YYYYY | yyyy | 19 | null | 2 | BASICS |
| 23 | ZZZZZ | zzzz | 15 | null | 2 | BASICS |

FIG. 24A

| No. | QUESTION | ANSWER | PARENT | CHILD | MAP No. | MAP NAME |
|---|---|---|---|---|---|---|
| 1 | MIGRATE FROM EXISTING CONTRACT | aaaa | 8 | 2, 3 | 1 | OFFICE ANSHIN 365 |
| 2 | INHERIT EXISTING CUSTOMER TENANTS INTO SERVICE | bbbb | 1 | 5, 6, 7 | 1 | OFFICE ANSHIN 365 |
| 3 | DO NOT INHERIT EXISTING CUSTOMER TENANTS INTO SERVICE | cccc | 1 | null | 1 | OFFICE ANSHIN 365 |
| 4 | GLOSSARY | dddd | 14 | 5, 6, 7 | 1 | OFFICE ANSHIN 365 |
| 5 | WHAT IS PRIOR APPROVAL? | eeee | 4, 2, 17 | 7 | 1, 2 | OFFICE ANSHIN 365 |
| 6 | WHAT IS SYNDICATION? | ffff | 4, 2, 17 | null | 1, 2 | OFFICE ANSHIN 365 |
| 7 | WHAT IS A TENANT? | gggg | 4, 2 | null | 1 | OFFICE ANSHIN 365 |
| 8 | NEW CONTRACT | hhhh | 11 | 1, 9, 10 | 1 | OFFICE ANSHIN 365 |
| 9 | USE OF Office 365 FOR THE FIRST TIME / TRIAL VERSION NOT USED | iiii | 8 | null | 1 | OFFICE ANSHIN 365 |
| 10 | USE OF Office 365 FOR THE FIRST TIME / TRIAL VERSION USED | jjjj | 8 | null | 1 | OFFICE ANSHIN 365 |

FIG. 24B

| No. | QUESTION | ANSWER | PARENT | CHILD | MAP No. | MAP NAME |
|---|---|---|---|---|---|---|
| 5 | WHAT IS PRIOR APPROVAL? | eeee | 4, 2, 17 | 7 | 1, 2 | OFFICE ANSHIN 365 |
| 6 | WHAT IS SYNDICATION? | ffff | 4, 2, 17 | null | 1, 2 | OFFICE ANSHIN 365 |
| 11 | NNNNN | nnnn | null | 13, 14 | 2 | BASICS |
| 12 | OOOOO | oooo | null | null | 2 | BASICS |
| 13 | PPPPP | pppp | 11 | 15, 16, 23 | 2 | BASICS |
| 14 | QQQQQ | qqqq | 11 | null | 2 | BASICS |
| 15 | RRRRR | rrrr | 13 | 17, 18 | 2 | BASICS |
| 16 | SSSSS | ssss | 13 | null | 2 | BASICS |
| 17 | TTTTT | tttt | 15 | 5, 6 | 2 | BASICS |
| 18 | UUUUU | uuuu | 15 | null | 2 | BASICS |
| 19 | VVVVV | vvvv | null | 20, 21, 22 | 2 | BASICS |
| 20 | WWWWW | wwww | 19 | null | 2 | BASICS |
| 21 | XXXXX | xxxx | 19 | null | 2 | BASICS |
| 22 | YYYYY | yyyy | 19 | null | 2 | BASICS |
| 23 | ZZZZZ | zzzz | 15 | null | 2 | BASICS |

FIG. 26

| No. | QUESTION | ANSWER | PARENT | CHILD | MAP No. | MAP NAME |
|---|---|---|---|---|---|---|
| 1 | MIGRATE FROM EXISTING CONTRACT | aaaa | 8 | 2, 3 | 1 | OFFICE ANSHIN 365 |
| 2 | INHERIT EXISTING CUSTOMER TENANTS INTO SERVICE | bbbb | 1 | 5, 6, 7 | 1 | OFFICE ANSHIN 365 |
| 3 | DO NOT INHERIT EXISTING CUSTOMER TENANTS INTO SERVICE | cccc | 1 | null | 1 | OFFICE ANSHIN 365 |
| 4 | GLOSSARY | dddd | 14 | 5, 6, 7 | 1 | OFFICE ANSHIN 365 |
| 5 | WHAT IS PRIOR APPROVAL? | eeee | 4, 2, 17 | 7 | 1, 2 | OFFICE ANSHIN 365 |
| 6 | WHAT IS SYNDICATION? | ffff | 4, 2, 17 | null | 1, 2 | OFFICE ANSHIN 365 |
| 7 | WHAT IS A TENANT? | gggg | 4, 2, 17 | null | 1, 2 | OFFICE ANSHIN 365 |
| 8 | NEW CONTRACT | hhhh | 11 | 1, 9, 10 | 1 | OFFICE ANSHIN 365 |
| 9 | USE OF Office 365 FOR THE FIRST TIME / TRIAL VERSION NOT USED | iiii | 8 | null | 1 | OFFICE ANSHIN 365 |
| 10 | USE OF Office 365 FOR THE FIRST TIME / TRIAL VERSION USED | jjjj | 8 | null | 1 | OFFICE ANSHIN 365 |
| 11 | NNNNN | nnnn | null | 13, 14 | 2 | BASICS |
| 12 | OOOOO | oooo | null | null | 2 | BASICS |
| 13 | PPPPP | pppp | 11 | 15, 16, 23 | 2 | BASICS |
| 14 | QQQQQ | qqqq | 11 | null | 2 | BASICS |
| 15 | RRRRR | rrrr | 13 | 17, 18 | 2 | BASICS |
| 16 | SSSSS | ssss | 13 | null | 2 | BASICS |
| 17 | TTTTT | tttt | 15 | 5, 6, 7 | 2 | BASICS |
| 18 | UUUUU | uuuu | 15 | null | 2 | BASICS |
| 19 | VVVVV | vvvv | null | 20, 21, 22 | 2 | BASICS |
| 20 | WWWWW | wwww | 19 | null | 2 | BASICS |
| 21 | XXXXX | xxxx | 19 | null | 2 | BASICS |
| 22 | YYYYY | yyyy | 19 | null | 2 | BASICS |
| 23 | ZZZZZ | zzzz | 15 | null | 2 | BASICS |

FIG. 27A

| No. | QUESTION | ANSWER | PARENT | CHILD | MAP No. | MAP NAME |
|---|---|---|---|---|---|---|
| 1 | MIGRATE FROM EXISTING CONTRACT | aaaa | 8 | 2, 3 | 1 | OFFICE ANSHIN 365 |
| 2 | INHERIT EXISTING CUSTOMER TENANTS INTO SERVICE | bbbb | 1 | 5, 6, 7 | 1 | OFFICE ANSHIN 365 |
| 3 | DO NOT INHERIT EXISTING CUSTOMER TENANTS INTO SERVICE | cccc | 1 | null | 1 | OFFICE ANSHIN 365 |
| 4 | GLOSSARY | dddd | 14 | 5, 6, 7 | 1 | OFFICE ANSHIN 365 |
| 5 | WHAT IS PRIOR APPROVAL? | eeee | 4, 2 | 7 | 1, 2 | OFFICE ANSHIN 365 |
| 6 | WHAT IS SYNDICATION? | ffff | 4, 2 | null | 1, 2 | OFFICE ANSHIN 365 |
| 7 | WHAT IS A TENANT? | gggg | 4, 2 | null | 1, 2 | OFFICE ANSHIN 365 |
| 8 | NEW CONTRACT | hhhh | 11 | 1, 9, 10 | 1 | OFFICE ANSHIN 365 |
| 9 | USE OF Office 365 FOR THE FIRST TIME / TRIAL VERSION NOT USED | iiii | 8 | null | 1 | OFFICE ANSHIN 365 |
| 10 | USE OF Office 365 FOR THE FIRST TIME / TRIAL VERSION USED | jjjj | 8 | null | 1 | OFFICE ANSHIN 365 |

FIG. 27B

| No. | QUESTION | ANSWER | PARENT | CHILD | MAP No. | MAP NAME |
|---|---|---|---|---|---|---|
| 5 | WHAT IS PRIOR APPROVAL? | eeee | 17 | 7 | 1, 2 | OFFICE ANSHIN 365 |
| 6 | WHAT IS SYNDICATION? | ffff | 17 | null | 1, 2 | OFFICE ANSHIN 365 |
| 7 | WHAT IS A TENANT? | gggg | 17 | null | 1, 2 | OFFICE ANSHIN 365 |
| 11 | NNNNN | nnnn | null | 13, 14 | 2 | BASICS |
| 12 | OOOOO | oooo | null | null | 2 | BASICS |
| 13 | PPPPP | pppp | 11 | 15, 16, 23 | 2 | BASICS |
| 14 | QQQQQ | qqqq | 11 | null | 2 | BASICS |
| 15 | RRRRR | rrrr | 13 | 17, 18 | 2 | BASICS |
| 16 | SSSSS | ssss | 13 | null | 2 | BASICS |
| 17 | TTTTT | tttt | 15 | 5, 6, 7 | 2 | BASICS |
| 18 | UUUUU | uuuu | 15 | null | 2 | BASICS |
| 19 | VVVVV | vvvv | null | 20, 21, 22 | 2 | BASICS |
| 20 | WWWWW | wwww | 19 | null | 2 | BASICS |
| 21 | XXXXX | xxxx | 19 | null | 2 | BASICS |
| 22 | YYYYY | yyyy | 19 | null | 2 | BASICS |
| 23 | ZZZZZ | zzzz | 15 | null | 2 | BASICS |

T₀

INFORMATION MANAGEMENT APPARATUS, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-203056 filed Nov. 8, 2019.

BACKGROUND

(i) Technical Field

The present disclosure relates to an information management apparatus, an information processing apparatus, and a non-transitory computer readable medium.

(ii) Related Art

In the related art, attempts have been made to increase the searchability of data by using a model that expresses the structure of relation between components expressing the information. Examples include topic maps, semantic networks, and concept maps.

As one example of utilizing a topic map (a data model defined by ISO 13250) as a technology for achieving multifactorial data classification, Japanese Unexamined Patent Application Publication No. 2006-215753 discloses a search apparatus provided with an index generation unit that generates an index used to search a data group from a topic map including an information network, a search query input unit that inputs a search condition and issues a search instruction, a search unit that searches for data conforming to the search condition according to the search instruction, and a display unit that displays indexed data of the data returned by the search unit as a search result.

SUMMARY

However, creating such a map may require specialized knowledge, and without such specialized knowledge, creating the map may be difficult in some cases. On the other hand, a map may be treated as a tree structure produced from parent-child relationships existing between components.

Aspects of non-limiting embodiments of the present disclosure relate to easily creating parent-child relationships between components compared to the case of not editing the parent-child relationships between components in a tree structure.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information management apparatus including a processor configured to associate components including questions and answers to the questions using parent-child relationships and control a display of the components as a tree structure, receive a selection of a subset of components in the tree structure according to a user operation and also connect the selected subset of components to the tree structure, and change the parent-child relationships of the components according to the connection of the components.

BRIEF DESCRIPTION OF THE DRAWINGS

An exemplary embodiment of the present disclosure will be described in detail based on the following figures, wherein:

FIG. 3 is a block diagram explaining an exemplary functional configuration of a map creation apparatus;

FIGS. 6A and 6B are diagrams illustrating one example of tables;

FIG. 7 illustrates a case of connecting a selected component as a parent;

FIG. 8 is a diagram illustrating changes in a table when the operation illustrated in FIG. 7 is performed;

FIG. 10 is a diagram illustrating changes in a table when the operation illustrated in FIG. 9 is performed;

FIG. 12 is a diagram illustrating changes in a table when the operation illustrated in FIG. 11 is performed;

FIG. 17 is a diagram illustrating a table provided with an identification assistance column;

FIGS. 19A and 19B are diagrams illustrating two maps having a tree structure;

FIG. 20 is a diagram illustrating a table for creating the tree structures illustrated in FIGS. 19A and 19B;

FIGS. 21A and 21B are diagrams illustrating a case of dividing the table illustrated in FIG. 20 into two tables;

FIGS. 22A and 22B are diagrams illustrating a case of connecting components in one map in FIGS. 21A and 21B to the tree structure of another map;

FIG. 23 is a diagram illustrating a table after parent-child relationships are changed by the operation described in FIGS. 22A and 22B;

FIGS. 24A and 24B are diagrams illustrating a table after parent-child relationships are changed by the operation described in FIGS. 22A and 22B;

FIG. 26 is a diagram illustrating a table after parent-child relationships are changed by the operation described in FIGS. 25A and 22B; and FIGS. 27A and 27B are diagrams illustrating a table after parent-child relationships are changed by the operation described in FIGS. 25A and 25B.

DETAILED DESCRIPTION

Hereinafter, an exemplary embodiment of the present disclosure will be described in detail and with reference to the attached drawings.

<Description of Overall Information Processing System>

Figure 1:
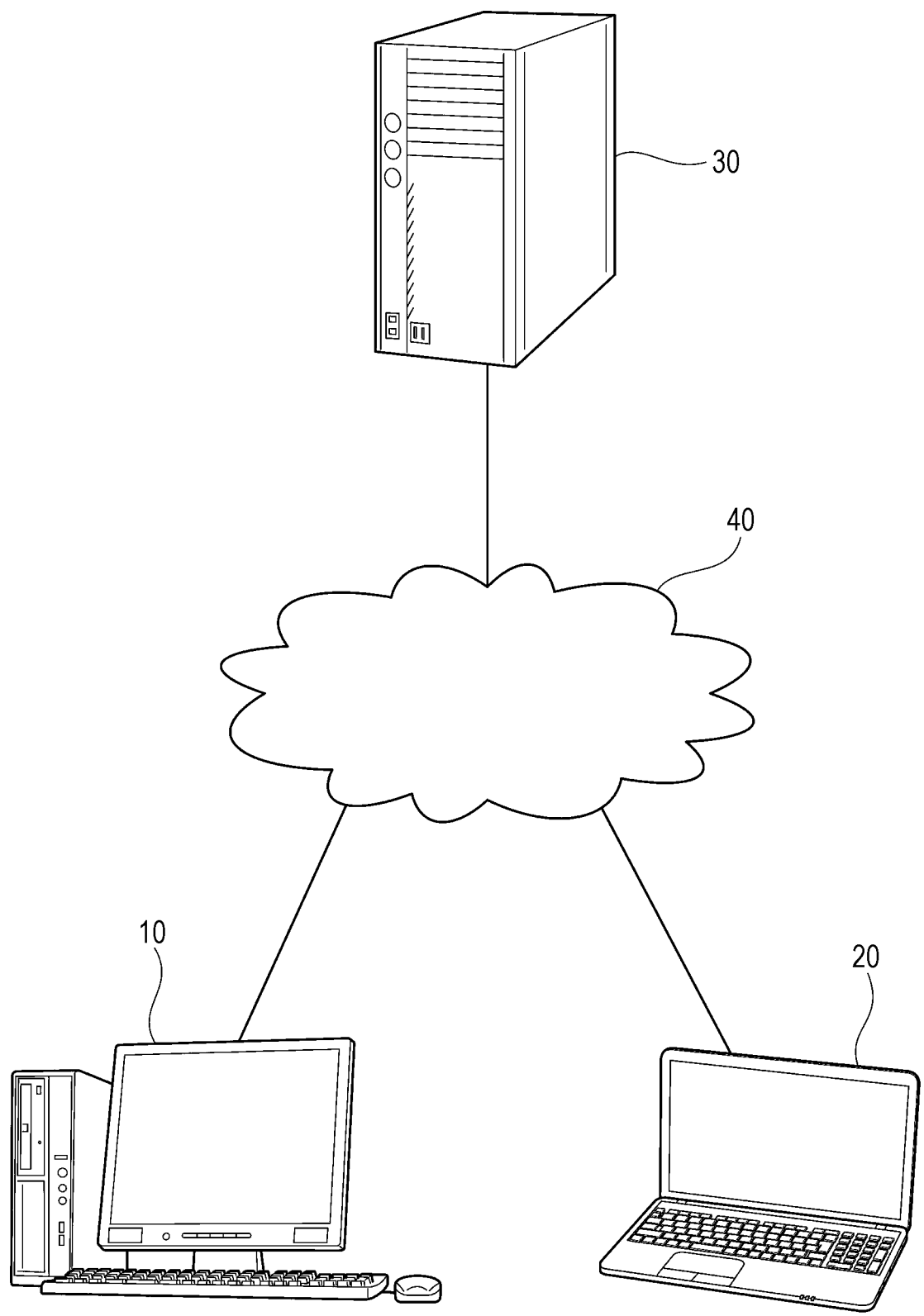
FIG. 1 is a diagram illustrating an exemplary configuration of an information processing system according to an exemplary embodiment.

FIG. 1 is a diagram illustrating an exemplary configuration of an information processing system 1 according to the exemplary embodiment. In the information processing system 1 illustrated in the diagram, a map creation apparatus 10 that creates a map in which components are arranged in a tree structure, an information processing apparatus 20 that processes information by using the created map, and a management server 30 that manages the map are connected through a network 40. Note that although FIG. 1 illustrates only one each of the map creation apparatus 10 and the information processing apparatus 20, multiple apparatuses may also be connected to the network 40.

The map creation apparatus 10 is one example of an information management apparatus, and creates the map described later. Also, the information processing apparatus 20 process predetermined information processing using the map created by the map creation apparatus 10. The map creation apparatus 10 and the information processing apparatus 20 are computer apparatuses such as general-purpose personal computers (PCs), mobile computers, mobile phones, smartphones, or tablets, for example. The map creation apparatus 10 creates the map by causing application software to run under management by an operating system (OS). The information processing apparatus 20 also performs the information processing using the map by causing application software to run under management by the OS. Although described in detail later, the information processing apparatus 20 is for example a chat bot that outputs an answer when a user inputs an inquiry. Additionally, in the exemplary embodiment, the map created by the map creation apparatus 10 is used when producing an answer. Specific examples of application conceivably include a frequency asked questions list (FAQ) used internally by a corporation, a FAQ for customers, communication tools, educational equipment, portraits, and application software development support.

The management server 30 is a server computer that manages the information processing system 1 as a whole. For example, the management server 30 authenticates a user who operates the map creation apparatus 10, and receives an upload of a created map. The management server 30 also authenticates a user who operates the information processing apparatus 20, and receives a download of the map.

Each of the map creation apparatus 10, the information processing apparatus 20, and the management server 30 is provided with a central processing unit (CPU) that acts as a computing unit, main memory that acts as a memory unit, and storage such as a hard disk drive (HDD) or a solid-state drive (SSD). Here, the CPU is one example of a processor, and executes various software such as an OS (basic software) and application software. Also, the main memory is a storage area that stores information such as various software and data used to execute the software, while the storage is a storage area that stores information such as input data that is input into various software and output data that is output from various software.

Furthermore, each of the map creation apparatus 10, the information processing apparatus 20, and the management server 30 is provided with a communication interface (hereinafter designated "communication I/F") for communicating externally, a display unit including video memory, a display, and the like, and input devices such as a keyboard, a mouse, and a touch panel.

As described above, the network 40 is a communication unit that interconnects multiple map creation apparatuses 10 and the management server 30 to each other, and is used for information communication between each of the map creation apparatuses 10 and the management server 30. The network 40 is a local area network (LAN) or the Internet, for example. In the case where the network 40 is the Internet, the management server 30 may also be considered to be a cloud server that manages and provides the map.

<Description of Functional Configuration of Map Creation Apparatus 10>

Next, the map creation apparatus 10 will be described in further detail. The map creation apparatus 10 according to the exemplary embodiment is an apparatus that creates a map in which components, including questions and answers, are connected in a tree structure. Here, a "map" means a diagram associating components with each other. In the exemplary embodiment, a tree structure is adopted as the method of association. Consequently, the map according to the exemplary embodiment may be expressed as a diagram that connects components to each other to form a tree structure.

The "tree structure" is a structure in which components are arranged in a hierarchy, with multiple components positioned in a lower level branching off from a single component belonging to a higher level.

In the tree structure, the levels exist in a parent-child relationship with each other, and a parent component may have multiple child components. Also, a child component itself may act as a parent component having multiple child components.

In the exemplary embodiment, "components" include questions and answers to questions. Questions and answers are typically expressed through text, but are not limited to text, and may also be information such as images, sounds, and computer language, for example. Also, an image may be a still image or a moving image. Furthermore, the components may also be a combination of the above. That is, in the case where a question is an image, the question may be representational information. Also, the answer to the above question may be text information expressing what the image means, for example. Specifically, in the case where an image of a photograph of a cat is set as the question, text information stating, "This is a photograph of a cat." is set as the answer, for example.

Figure 2A:
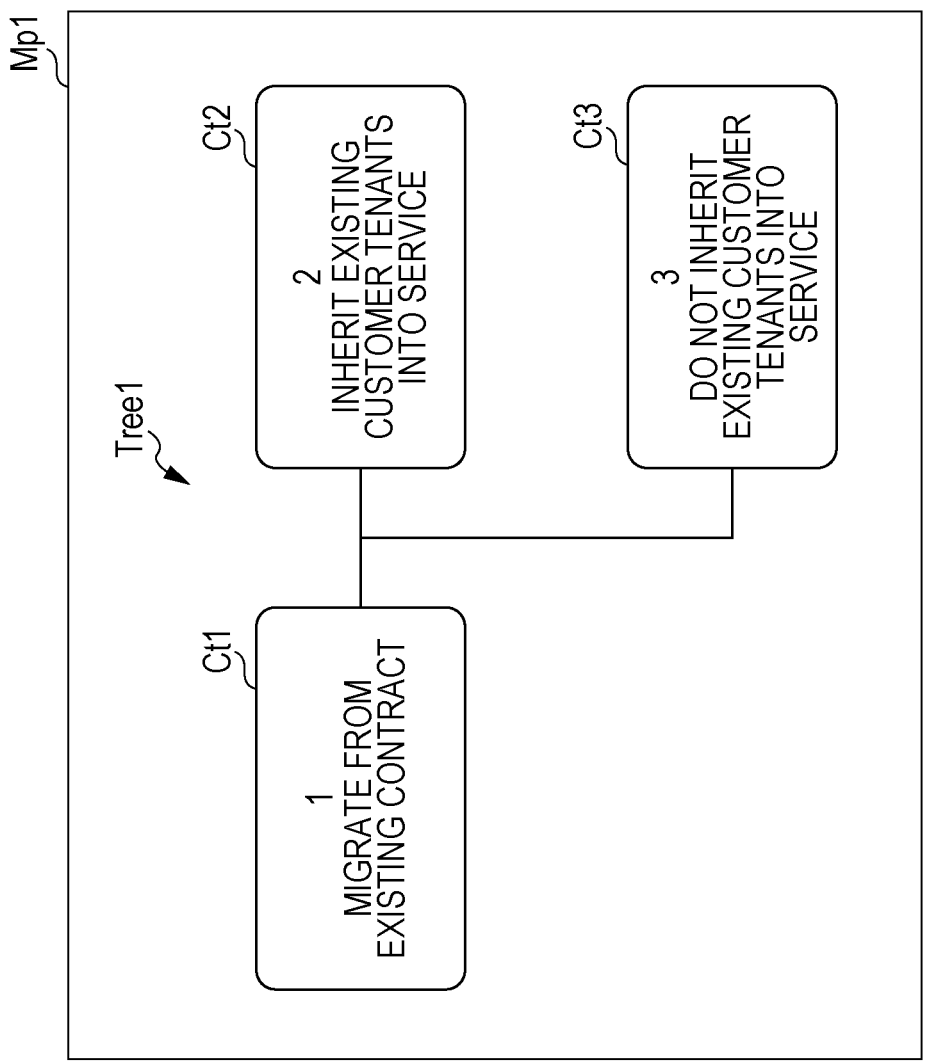
FIGS. 2A and 2B are diagrams explaining a map according to the exemplary embodiment.
Figure 2B:
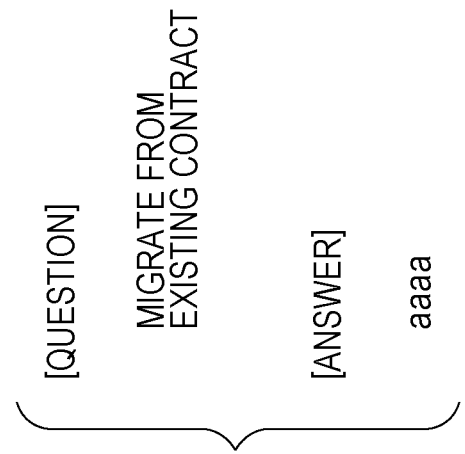

FIGS. 2A and 2B are diagrams explaining a map according to the exemplary embodiment. Of these, FIG. 2A is a diagram illustrating an example of a map. A map Mp1 illustrated in the diagram is displayed on a display, for example. The map Mp1 contains three components Ct1 to Ct3. Additionally, the components Ct1 to Ct3 are interconnected to create a tree structure Tree1. Parent-child relationships exist among the components Ct1 to Ct3, such that the component Ct1 is the parent while the components Ct2 and Ct3 are children. Note that in the following, the components may be simply referred to as the "component(s) Ct" when each component is not being distinguished individually. Also, multiple maps may be simply referred to as the "map(s) Mp" when each map is not being distinguished individually. Furthermore, multiple tree structures may be simply referred to as the "tree structure(s) Tree" when each tree structure is not being distinguished individually.

Each map is assigned a unique ID to enable multiple maps to be distinguished from each other. Also, when a map is edited as described later, the map before the edit and the map after the edit may also be assigned different IDs. In this case, map version control may be achieved through the use of IDs. Furthermore, by treating categories and classes as components Ct, classification according to category and class may also be achieved.

Also, FIG. 2B is a diagram illustrating one example of a question and an answer to the question included in the components Ct. Here, the question of the component Ct1 and an answer to the question are illustrated. As illustrated by the diagram, "Migration from existing contract" is set as the question, and "aaaa" is set as the answer. Note that "aaaa" is actually a long string of text, but is illustrated as "aaaa" here as a simplified concept. In this case, the question and the answer are both expressed as text. Additionally, as illustrated in FIG. 2A, the map Mp1 includes questions in a tree structure. In other words, by associating questions with each other, the components Ct1 to Ct3 are connected, and the map Mp1 is created.

FIG. 3 is a block diagram explaining an exemplary functional configuration of the map creation apparatus 10. Note that the diagram illustrates a selection of units related to the exemplary embodiment from among a variety of functions included in the map creation apparatus 10.

The map creation apparatus 10 is provided with a reception unit 11 that receives a user instruction, a connection unit 12 that connects components to each other, a changing unit 13 that changes parent-child relationships between components according to new connection relationships, a saving unit 14 that saves a map Mp, and a display control unit 15 that creates display information for displaying a tree structure.

The reception unit 11 receives a selection of a subset of components Ct in a map Mp according to a user operation. Although described in detail later, the reception unit 11 receives an instruction to select a subset of a tree structure as the user instruction. The reception unit 11 also receives an instruction to connect the selected subset of the tree structure to another component Ct as the user instruction. The reception unit 11 corresponds to a CPU and an input device, for example.

Although described in detail later, the connection unit 12 connects the selected subset of components in the map Mp according to the user instruction received by the reception unit 11. In this case, the connection unit 12 connects multiple components Ct having a parent-child relationship to another component Ct, and changes the map Mp. The connection unit 12 corresponds to a CPU, for example.

The changing unit 13 changes the parent-child relationship of the components Ct according to the connections between the components Ct set by the connection unit 12. In other words, because new parent-child relationships are produced in accordance with the connections between the components Ct set by the connection unit 12, the changing unit 13 changes the parent-child relationships accordingly. In actuality, the changing unit 13 changes a table describing the parent-child relationships. The changing unit 13 corresponds to a CPU, for example.

The saving unit 14 saves the content of components and parent-child relationships used to create the map Mp. In actuality, the saving unit 14 saves a table describing the content of components and parent-child relationships. The saving unit 14 corresponds to storage, for example.

The display control unit 15 associates the components Ct using parent-child relationships and controls the display of the map Mp arranged as a tree structure. In other words, the display control unit 15 creates display data for displaying the map Mp of the components Ct in a tree structure on a display, and sends the created display data to the display.

<Descriptions of Operations by Map Creation Apparatus 10>

Figure 4:
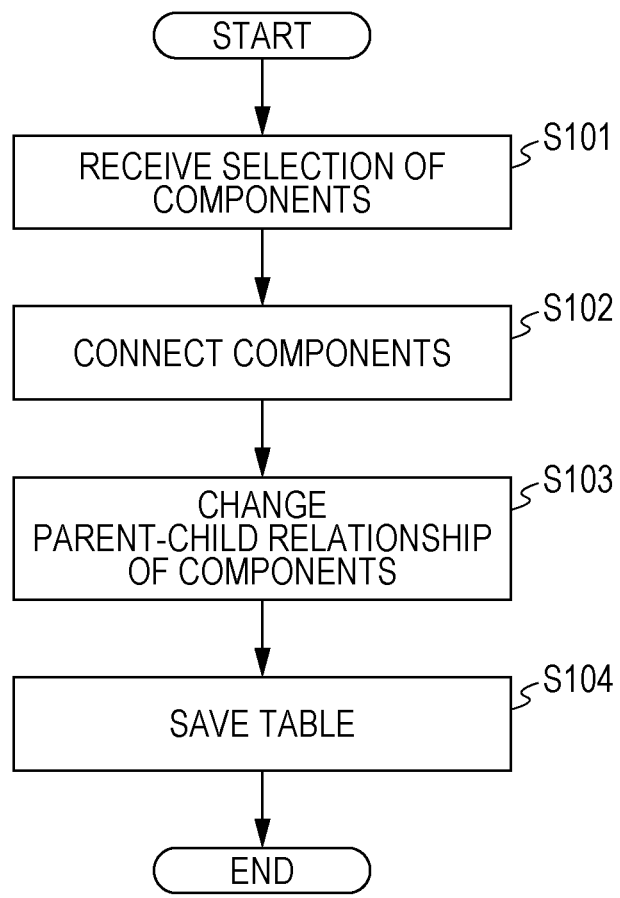
FIG. 4 is a flowchart explaining operations by the map creation apparatus.

Next, operations by the map creation apparatus 10 will be described. FIG. 4 is a flowchart explaining operations by the map creation apparatus 10. First, the reception unit 11 receives a selection of a subset of components Ct in the map Mp from the user (step 101). Next, the connection unit 12 connects the selected subset of components Ct in the map Mp according to the user instruction (step 102).

Figure 5B:
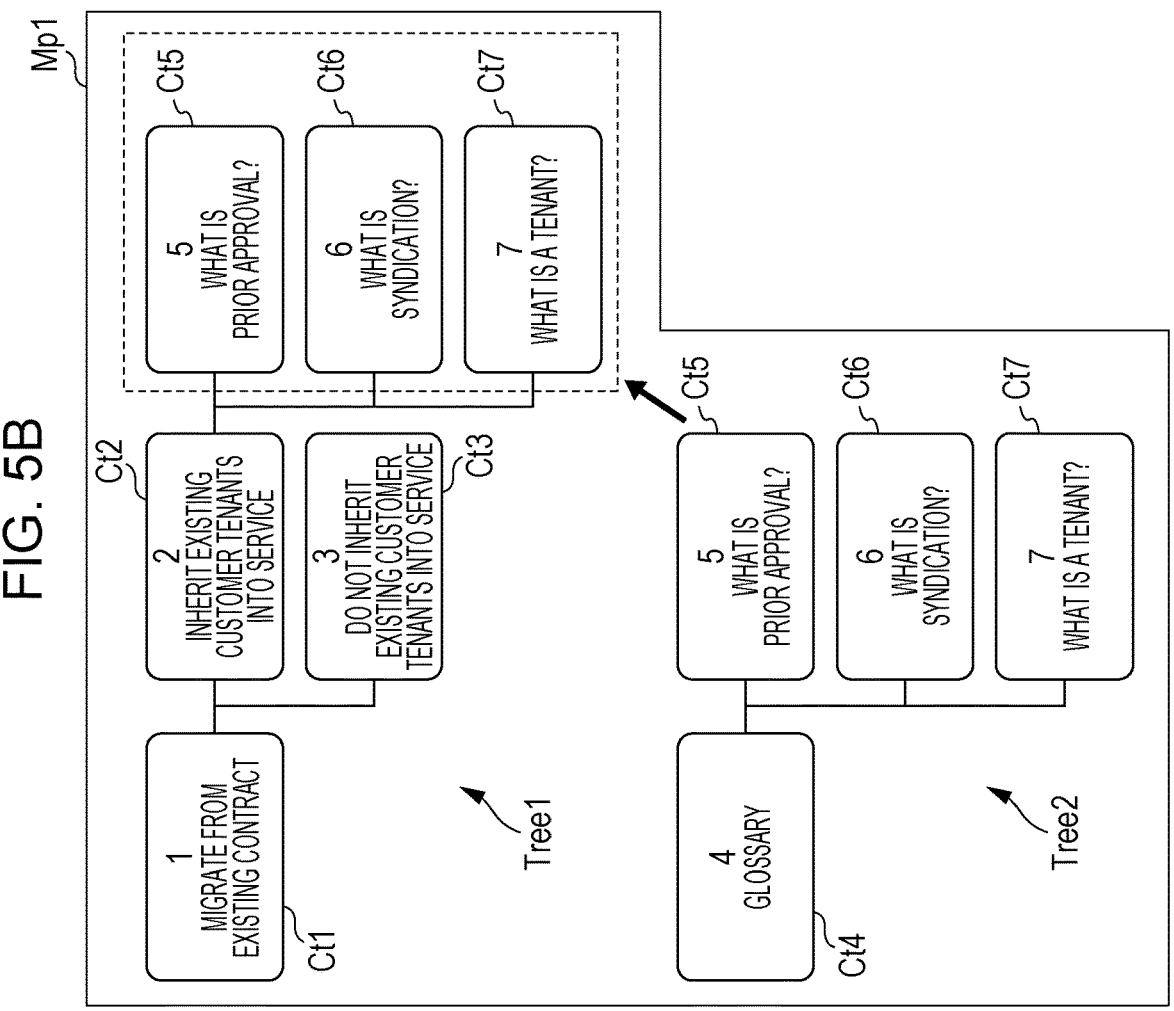
FIGS. 5A and 5B are diagrams illustrating a case in which a user actually performs the operations of step 101 and step 102 in FIG. 4.
Figure 5A:
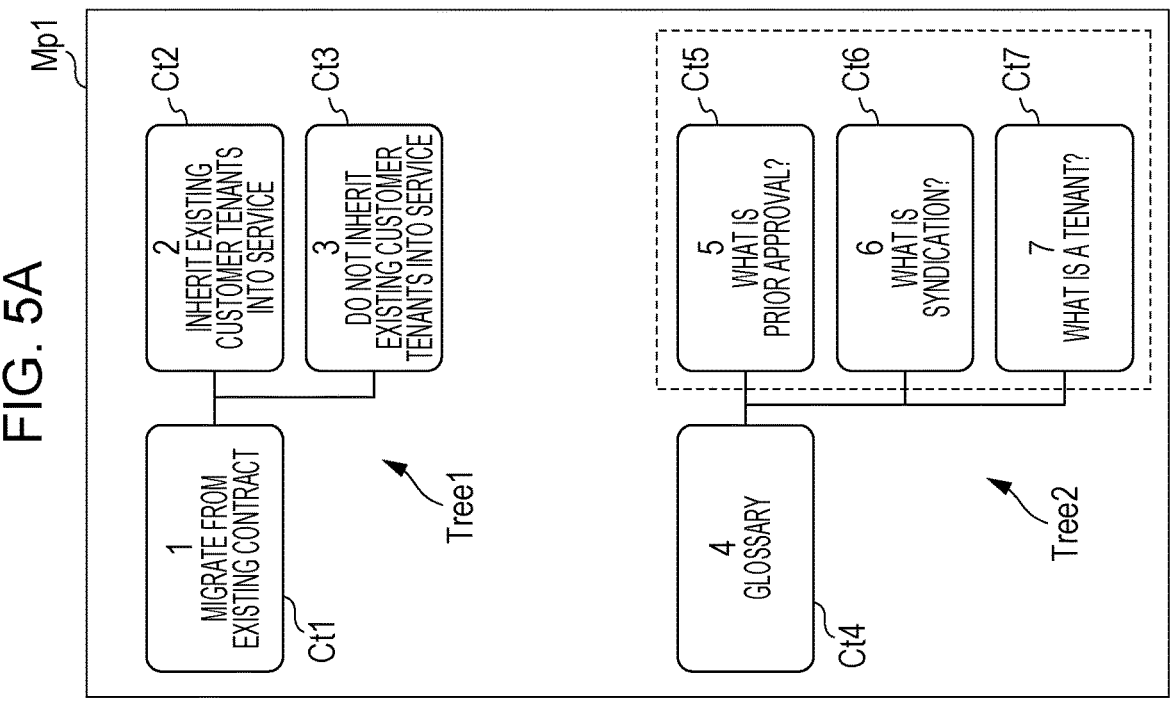

FIGS. 5A and 5B are diagrams illustrating a case in which a user actually performs the operations of step 101 and step 102 in FIG. 4. Of these, FIG. 5A illustrates tree structures Tree1 and Tree2 before the operations of step 101 and step 102 are performed. Also, FIG. 5B illustrates the state of the tree structures Tree1 and Tree2 after the operations of step 101 and step 102 are performed. Here, the two tree structures Tree1 and Tree2 are illustrated as tree structures included in the map Mp1. The tree structure Tree1 illustrated in FIG. 5A is similar to the tree structure Tree1 illustrated in FIG. 2A, and includes components Ct1 to Ct3 forming the tree structure. On the other hand, the tree structure Tree2 illustrated in FIG. 5A includes components Ct4 to Ct7 forming the tree structure.

Here, a case of connecting the components Ct5 to Ct7 in the tree structure Tree2 to the tree structure Tree1 and changing from the state in FIG. 5A to the state in FIG. 5B is illustrated. At this time, the user selects the components Ct5 to Ct7 from the tree structure Tree2, as illustrated in FIG. 5A. This corresponds to the operation in step 101 above. Herein, the selected part of the tree structure Tree2 is indicated by the dashed-line rectangle. Additionally, as illustrated in FIG. 5B, the selected components Ct5 to Ct7 are connected as children of the component Ct2 in the tree structure Tree1. Herein, the connected part is indicated by the dashed-line rectangle. With this arrangement, the tree structure Tree1 illustrated in FIG. 5A is updated to the tree structure Tree1 illustrated in FIG. 5B. This corresponds to the operation in step 102 above. Note that, as illustrated in FIG. 5B, the components Ct5 to Ct7 in the tree structure Tree2 remain unchanged. In other words, the components Ct5 to Ct7 are not moved from the tree structure Tree2 to the tree structure Tree1, but rather copied and pasted so to speak. Note that only the components of the connection source (copy and paste source) as assumed to be editable.

In steps 101 to 102, a process of receiving the selection of the components Ct5 to Ct7 as a subset of the tree structure Tree1 from among the two tree structures Tree1 and Tree2 and also connecting the selected subset of components Ct5 to Ct7 to the other tree structure Tree2 is performed. The user is able to edit the tree structure Tree1 by performing a drag and drop operation with a mouse or the like for example while looking at the tree structures Tree1 and Tree2 displayed on a display. The image is created by the display control unit 15. Note that although an operation on the two tree structures Tree1 and Tree2 is illustrated herein, the configuration is not limited thereto, and it is also possible to display three or more tree structures Tree and perform similar operations. In other words, multiple tree structures Tree may be displayed and edited by selecting and connecting components Ct in each of the tree structures Tree.

Returning to FIG. 4, the changing unit 13 changes the parent-child relationship of the components Ct (step 103). Furthermore, the saving unit 14 saves a table corresponding to the changed parent-child relationship (step 104).

FIGS. 6A and 6B are diagrams illustrating one example of tables. Of these, FIG. 6A illustrates a table Ta before the parent-child relationship is changed in step 103. Also, FIG. 6B illustrates a table Tb after the parent-child relationship is changed in step 103. The tables Ta and Tb illustrated in FIGS. 6A and 6B contain records for the respective columns "No.", "Question", "Answer", "Parent", and "Child". Of these, "No." is an ID assigned to each component Ct. Also, the questions and answers described earlier are stated in the "Question" and "Answer" columns. Additionally, the parent-child relationships described earlier are stated specifically in the "Parent" and "Child" columns. Here, a parent-child relationship is specified by "No.". For example, the case where "Parent" is "1" means that the component Ct in the next-higher layer of the tree structure Tree is the No. 1 component Ct1. As another example, the case where "Child" is "2, 3" means that the components Ct in the next-lower layer of the tree structure Tree are the No. 2 and No. 3 components Ct2 and Ct3. Note that the "null" case means that no parent or no child exists. For example, because the No. 1 component Ct is positioned in the highest layer of the tree structure Tree, no parent component exists, and therefore the "Parent" column is "null".

As described in FIGS. 5A and 5B, in steps 101 to 102, a process of connecting the components Ct5 to Ct7 in the tree structure Tree2 as children of the component Ct2 in the tree structure Tree1 is performed. A comparison between FIGS. 6A and 6B demonstrates that first, the "Child" column of the No. 2 component Ct2 is changed from "null" to "5, 6, 7". In other words, this means that before the change, no child components Ct existed for the component Ct2, but after the change, the No. 5 to No. 7 components Ct5 to Ct7 are connected as children. Similarly, the "Parent" column of the No. 5 to No. 7 components Ct5 to Ct7 is changed from "4" to "4, 2". In other words, this means that before the change, only the No. 4 component Ct4 was the parent component Ct of the components Ct5 to Ct7, but after the change, the No. 2 component Ct2 is additionally connected as a parent. In this case, the changing of the parent-child relationship is a process of adding the components Ct5 to Ct7 as children of the parent component Ct2.

Such tables Ta and Tb are created to create the tree structures Tree of the components Ct1 to Ct7. In other words, the tree structures Tree may be constructed and displayed by referencing the content of the "Parent" and "Child" columns that express parent-child relationships with respect to the component indicated in the "No." column. Also, in the exemplary embodiment, a single table is sufficient to express multiple tree structures Tree, without preparing a separate table for each of the multiple tree structures Tree. In other words, even if the tree structures Tree are different, if the components Ct are shared in common, multiple tree structures Tree may be summarized in a single table. Consequently, it may also be said that the table according to the exemplary embodiment contains records including questions, answers to the questions, and information prescribing parent-child relationships for creating the tree structure Tree1 and the tree structure Tree2 in which the components Ct including the questions and answers are arranged in a tree structure, and also has a feature whereby records that include the same components are stored in the same table.

Furthermore, it may also be said that the data structure adopted by the table according to the exemplary embodiment is used with respect to a table for creating the map Mp in which the components Ct including questions and answers to the questions are arranged in a tree structure, the table containing records including the questions, the answers, and information prescribing parent-child relationships between the components, and also has a feature whereby records that include the same components are stored in the same table.

Note that in the above describes a case where the tree structure Tree1 and the tree structure Tree2 are displayed on a display, and the user looking at the display performs operations on the components Ct, but instead of displaying only the tree structure Tree1 and the tree structure Tree2, the tables Ta and Tb described in FIGS. 6A and 6B may also be displayed as well. In other words, the display control unit 15 controls the display of the tables Ta and Tb together with the tree structure Tree1 and the tree structure Tree2. With this arrangement, the user is able to understand how the tables are changed before and after the change of the map Mp1. Also, the table to be displayed may be a single table, and the table may be changed in real time in accordance with changes to the tree structures Tree1 and Tree2. In this case, when components Ct are connected, the display control unit 15 controls the change together with the display of the table according to the change.

In FIGS. 5A and 5B, the connection unit 12 selects components Ct in the tree structure Tree2 different from the tree structure Tree1, and connects the selected components Ct as children in the other tree structure Tree1, but the configuration is not limited thereto. Hereinafter, another example different from the above example will be described.

FIG. 7 illustrates a case of connecting a selected component Ct as a parent. This case illustrates an example in which components Ct8 to Ct10 indicated by the dashed-line rectangle are newly created and connected to the tree structure Tree1 of FIG. 5B. Among the components Ct8 to Ct10, the components Ct9 and Ct10 are connected as children to the parent component Ct8. Additionally, the example herein illustrates a case of connecting the component Ct8 as the parent of the component Ct1. Additionally, as a result, the component Ct8 becomes the highest layer, and the components Ct1, Ct9 and Ct10 are positioned in the next layer.

FIG. 8 is a diagram illustrating changes in a table when the operation illustrated in FIG. 7 is performed. The table before the parent-child relationships are changed by the operation illustrated in FIG. 7 is the table Tb of FIG. 6B. Also, the table after the parent-child relationships are changed by the operation illustrated in FIG. 7 is a table Tc of FIG. 8. Compared to the table Tb, records for the components Ct8 to C10 indicated by No. 8 to No. 10 have been added to the table Tc. Furthermore, the "Parent" column of the No. 1 component Ct1 is changed from "null" to "8".

Figure 9:
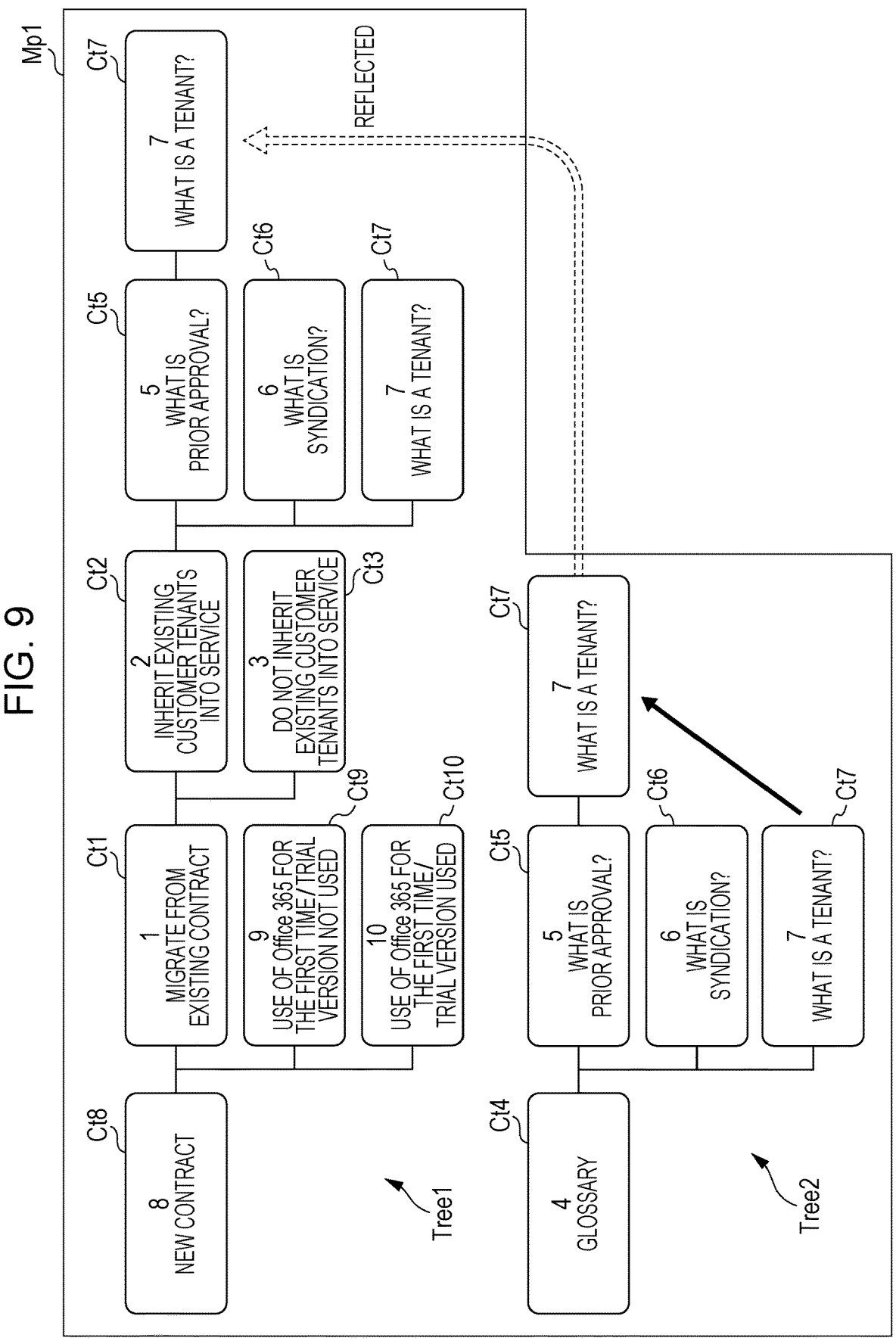
FIG. 9 illustrates a case of changing a component in one of two tree structures.

FIG. 9 illustrates a case of changing a component Ct in one of two tree structures Tree. As illustrated in the diagram, this case illustrates an example in which the tree structure Tree1 with the components Ct8 to Ct10 connected in FIG. 7 and the tree structure Tree2 in FIGS. 5A and 5B are displayed, and the component Ct7 is connected as a child of the component Ct5 in the tree structure Tree2. In this case, when there is a change in a parent-child relationship between components forming one of the tree structures Tree1 and Tree2, the connection unit 12 causes a similar change to be reflected in the other tree structure Tree. Herein, the tree structure Tree2 is changed, and a similar change is also applied to the tree structure Tree1. In other words, the component Ct7 is connected as a child of the component Ct5 in the tree structure Tree1. The components Ct5 to Ct7 in the tree structure Tree1 are a connection of components existing in the tree structure Tree2, and by causing a change in the tree structure Tree2 to also be reflected in the tree structure Tree1, the editing burden on the user is reduced. Furthermore, when there is a change in the question and the answer to the question in a component Ct forming one of the tree structures Tree1 and Tree2, a similar change may also be reflected in the component Ct forming the other tree structure Tree. In other words, it may also be said that when there is a change in the question and the answer to the question in a component Ct forming one of a first tree structure Tree and a second tree structure Tree, a similar change is also reflected in the component Ct forming the other tree structure Tree.

FIG. 10 is a diagram illustrating changes in a table when the operation illustrated in FIG. 9 is performed. The table before the parent-child relationships are changed by the operation illustrated in FIG. 9 is the table Tc of FIG. 8. Also, the table after the parent-child relationships are changed by the operation illustrated in FIG. 9 is a table Td of FIG. 10. Compared to the table Tc, in the table Td, the "Child" column of the component Ct5 indicated by No. 5 is changed from "null" to "7". Also, the "Parent" column of the component Ct7 indicated by No. 7 is changed from "4, 2" to "4, 2, 5". With this single change, the change in the parent-child relationships is reflected in both the tree structure Tree1 and the tree structure Tree2.

Figure 11:
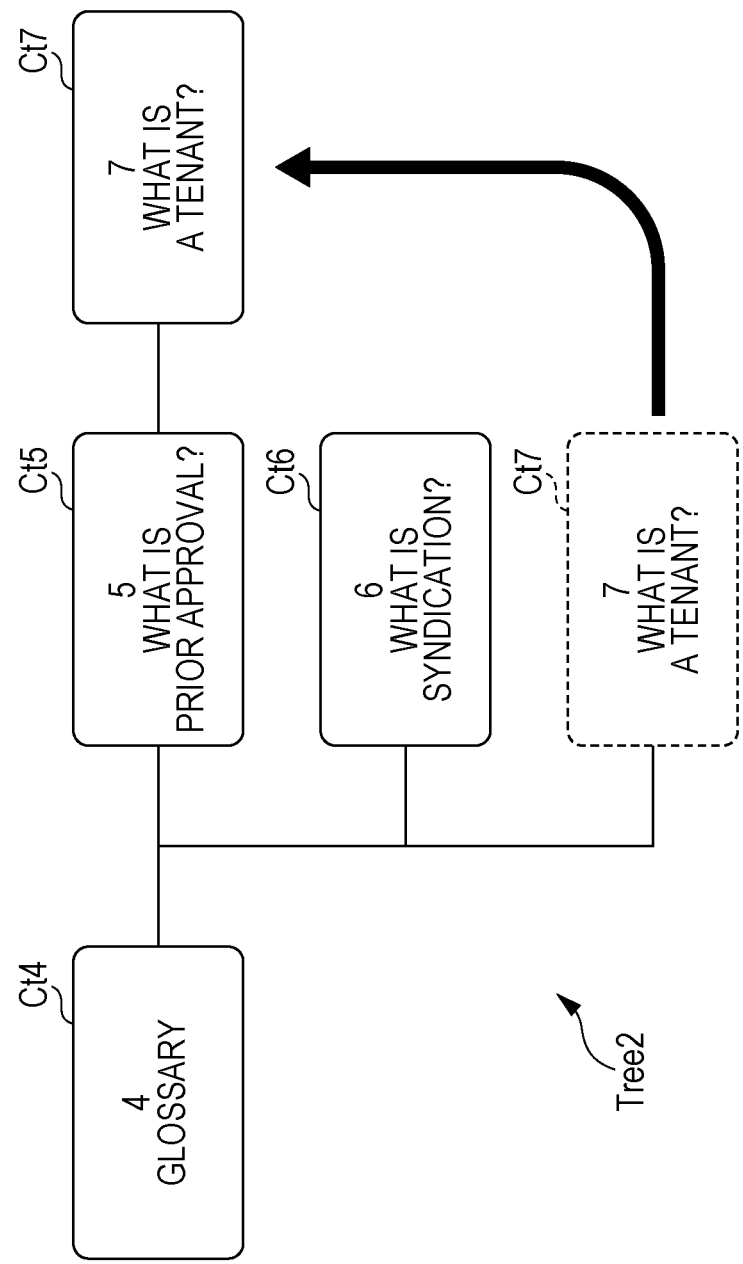
FIG. 11 illustrates a case of changing a parent-child relationship of components in the same tree structure.

FIG. 11 illustrates a case of disconnecting the component Ct7 from the parent component Ct4 in the tree structure Tree2, and connecting the component Ct7 as a child of the component Ct5.

FIG. 12 is a diagram illustrating changes in a table when the operation illustrated in FIG. 11 is performed. The table before the parent-child relationships are changed by the operation illustrated in FIG. 11 is the table Ta of FIG. 6A. Also, the table after the parent-child relationships are changed by the operation illustrated in FIG. 11 is a table Te of FIG. 12. Compared to the table Ta, in the table Te, the "Child" column of the component Ct4 indicated by No. 4 is changed from "5, 6, 7" to "5, 6". Also, the "Parent" column of the component Ct7 indicated by No. 7 is changed from "4" to "5". Also, the "Child" column of the component Ct5 indicated by No. 5 is changed from "null" to "7".

According to the map creation apparatus 10 described in detail above, a map creation tool with a high degree of freedom may be provided. Additionally, parent-child relationships between components Ct may be created easily, making it easier to organize and systematize the components. Furthermore, structuring the data of the components is easy, and a database may be constructed by creating the map Mp. Also, because the database is constructed through the creation of the map Mp, differences in perception between the creator of the map Mp and the architect of the database, inconsistencies, and rework suppression do not occur. Furthermore, it is possible to organize and systematize components intuitively and dynamically. In addition, multiple tree structures Tree may be stored in the same table. Also, although described in detail later, multiple maps Mp may also be stored in the same table. In this case, maps Mp suited to different scenarios and applications may be constructed and managed in the same table.

<Description of Information Processing Apparatus 20>

Next, the information processing apparatus 20 that performs information processing using the above map will be described. As described earlier, the information processing apparatus 20 according to the exemplary embodiment is a chat bot, for example. In other words, when a user submits an inquiry, the information processing apparatus 20 outputs an answer to the inquiry.

Figure 13:
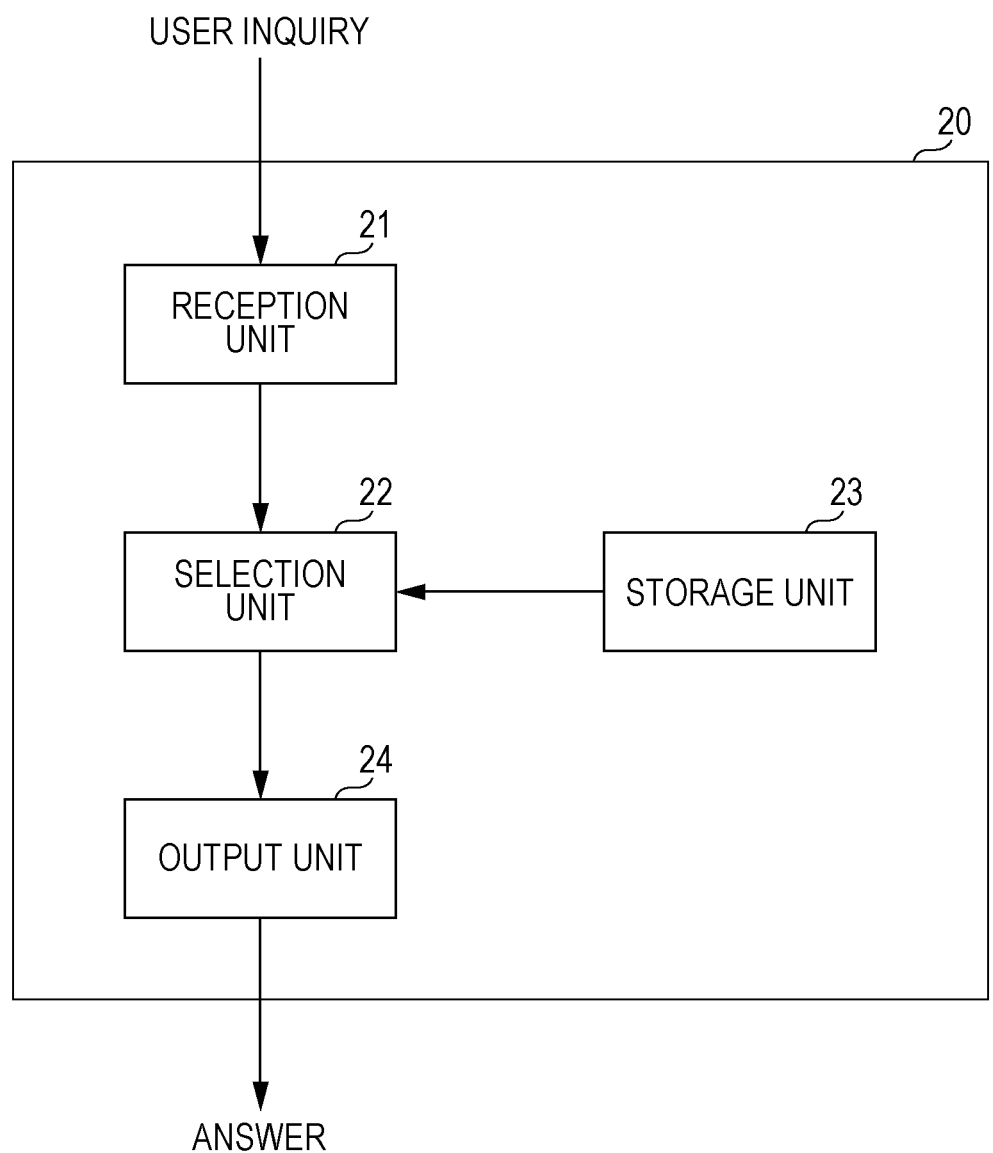
FIG. 13 is a block diagram explaining an exemplary functional configuration of an information processing apparatus.

FIG. 13 is a block diagram explaining an exemplary functional configuration of the information processing apparatus 20. Note that the diagram illustrates a selection of units related to the exemplary embodiment from among a variety of functions included in the information processing apparatus 20.

The information processing apparatus 20 is provided with a reception unit 21 that receives an inquiry from a user, a selection unit 22 that selects a question corresponding to the inquiry from the map Mp, a storage unit 23 that stores the map Mp, and an output unit 24 that outputs an answer to the selected question.

The reception unit 21 receives an inquiry input by the user. The reception unit 21 corresponds to a CPU and an input device, for example. Consequently, the inquiry may be input by using an input device such as a keyboard, for example. A question may also be input using speech. In the case of inputting an inquiry using speech, a microphone is used as the input device, for example.

The selection unit 22 selects a question conforming to the inquiry by the user from the map Mp. A specific method by which the selection unit 22 selects a question conforming to an inquiry will be described later. The selection unit 22 corresponds to a CPU, for example.

The storage unit 23 stores the map Mp created by the map creation apparatus 10 described above. In the information processing apparatus 20, the map Mp stored in the management server 30 is downloaded in advance and stored in the storage unit 23. At this time, the management server 30 may also prepare multiple maps Mp, and the information processing apparatus 20 may select and download a map Mp conforming to the use by the user from among the multiple maps Mp. The storage unit 23 corresponds to storage, for example.

The output unit 24 outputs an answer to the question selected by the selection unit 22. The output unit 24 references the map Mp stored in the storage unit 23 to output an answer to the selected question. The output unit 24 corresponds to a display, for example. Consequently, the answer is displayed as text or an image on a device such as a display provided in the information processing apparatus 20. The answer may also be output using speech. In the case of outputting the answer using speech, a speaker is used, for example.

<Description of Operations by Information Processing Apparatus 20>

Figure 14:
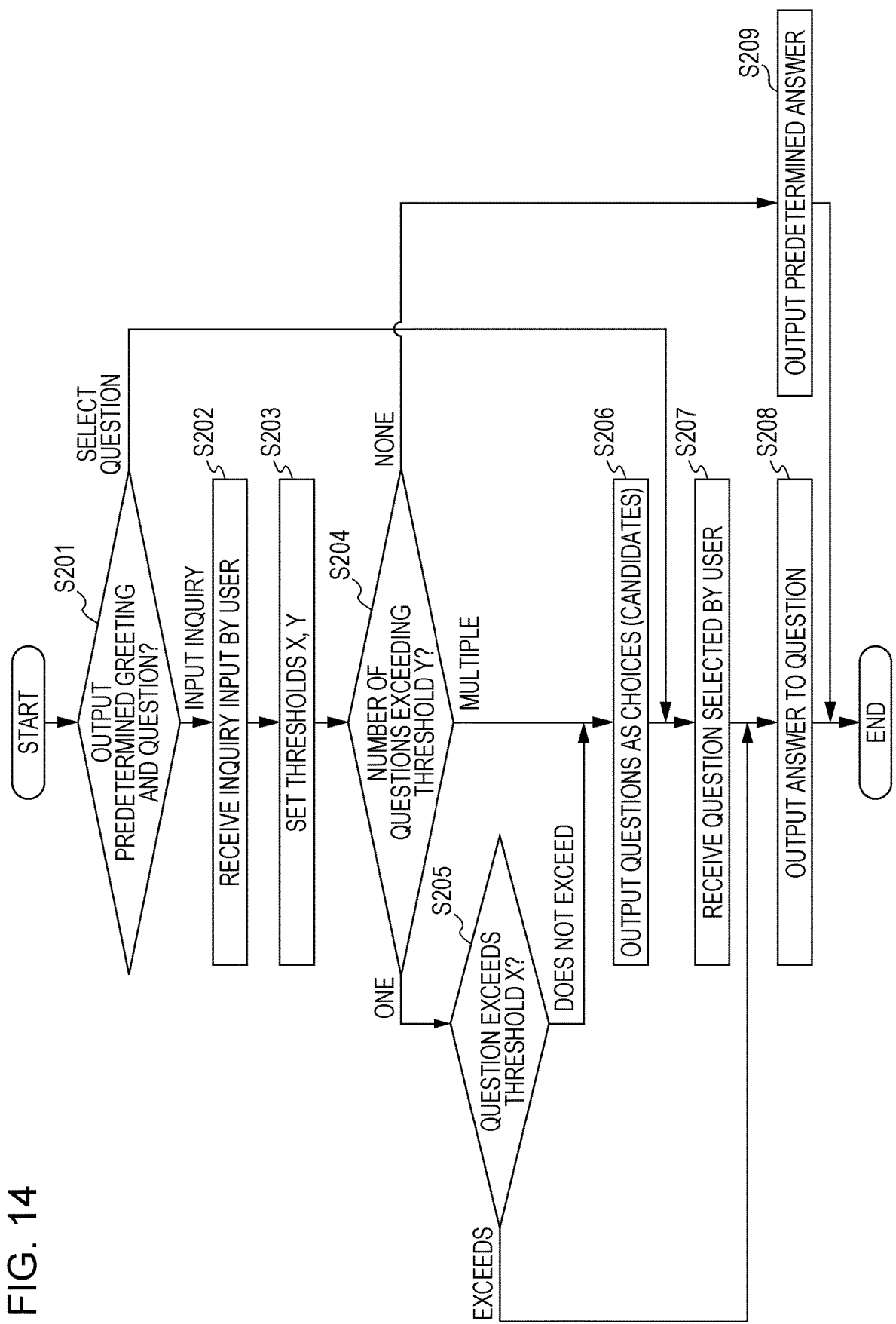
FIG. 14 is a flowchart explaining operations by the information processing apparatus.

Next, operations by the information processing apparatus 20 will be described. FIG. 14 is a flowchart explaining operations by the information processing apparatus 20. Although details will be described later, first, the output unit 24 outputs a greeting (step 201). Next, the reception unit 21 receives an inquiry from the user (step 202).

Here, the method by which the selection unit 22 selects a question conforming to the inquiry will be described in detail. The selection unit 22 creates an index in advance on the basis of questions in the map Mp. Additionally, the selection unit 22 selects a question on the basis of a degree of association between the index created from the questions in the map Mp and the inquiry from the user.

Figure 15A:
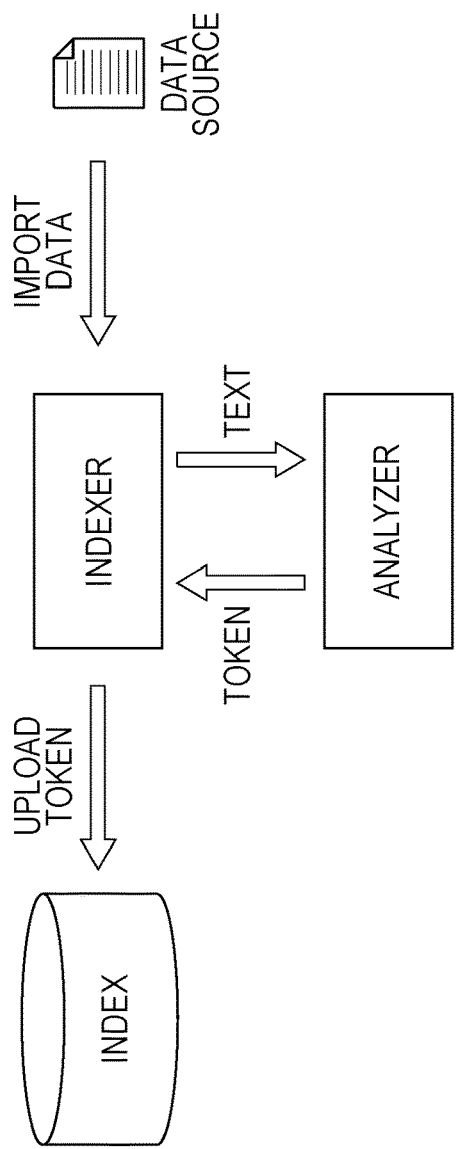
FIG. 15A is a diagram illustrating an example of a method of creating an index.

FIG. 15A is a diagram illustrating an example of a method of creating the index. Here, the questions in the map Mp are treated as a data source, and the data of the data source is imported into an indexer. In the indexer, text included in the data source is processed using an analyzer and organized into a format of words to register in the index. The analyzer formats the data to register in the index by dividing character strings included in the data source into units of words, normalizing variations in characters, and the like. The words processed by the analyzer are generally referred to as tokens. In other words, the questions are converted into tokens by the analyzer. Thereafter, the tokens are uploaded in a predetermined data structure and saved as a structure called the "index".

Figure 15B:
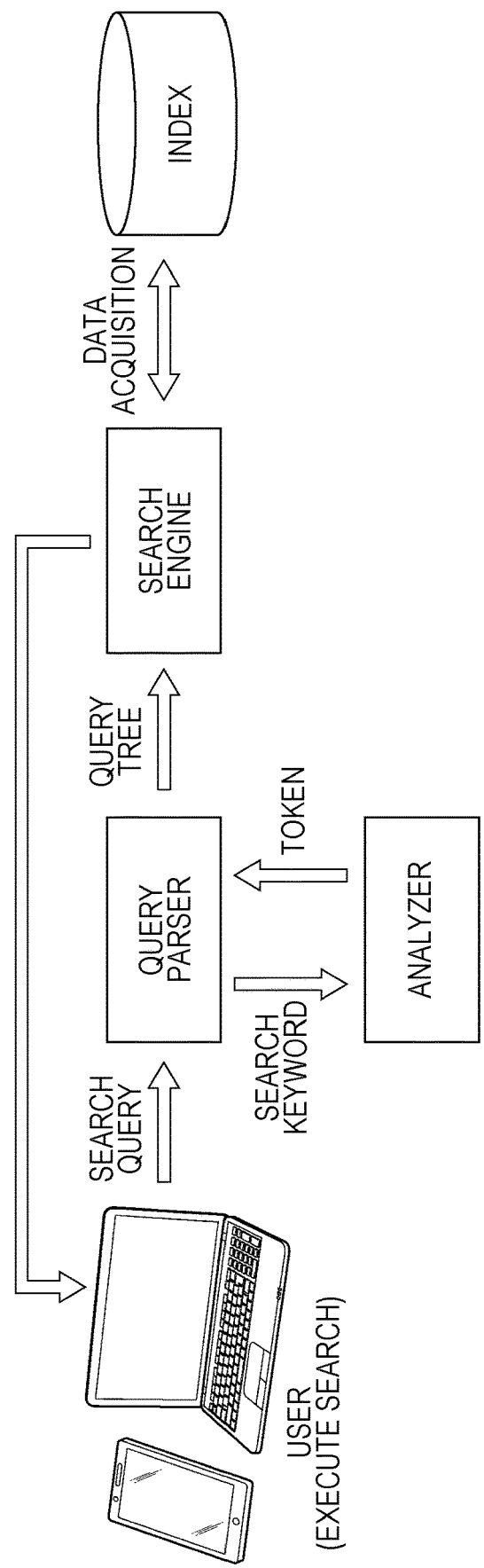
FIG. 15B is a diagram illustrating a method of searching an index.

Additionally, a user inquiry is similarly converted into a token, which is used as the basis for searching the index and selecting a question. FIG. 15B is a diagram illustrating a method of searching the index. First, a user inquiry is organized into a query format called a search query, and is processed by a query parser. The query parser passes a search keyword extracted from the query to the analyzer to convert the search keyword into a token, converts the token into an internal query format called a query tree, and passes the query tree to a search engine. The search engine uses the query tree to search the index for questions. The search engine performs a ranking process that reorders questions retrieved by the search in order of the degree of association. The ranked questions are treated as selected questions.

Returning to FIG. 14, the selection unit 22 sets two thresholds X and Y with respect to the degree of association (step 203). The thresholds X and Y are set such that X>Y. A degree of association having a larger value means a higher correlation. The threshold X refers to a numerical value of a degree of association between the content of the user inquiry and the question of a component that is considered high enough to output the answer without waiting for a selection by the user. Meanwhile, the threshold Y refers to a numerical value of a degree of association between the content of the user inquiry and the question of a component that is considered low enough to exclude from outputting the answer without waiting for a selection by the user. Thereafter, the selection unit 22 determines the number of questions whose degree of association exceeds the threshold Y (step 204). As a result, in the case where there is one question whose degree of association exceeding the threshold Y, and the degree of association exceeds the threshold X ("One" in step 204, "Exceeds" in step 205), the output unit 24 outputs the answer to the question (step 208). On the other hand, in the case where there is one question exceeding the threshold Y, but the degree of association does not exceed the threshold X ("One" in step 204, "Does not exceed" in step 205), the question is output as a candidate (choice) (step 206). Also, in the case where multiple questions exceed the threshold Y ("Multiple" in step 204), the output unit 24 outputs the multiple questions as candidates to the user (step 206). Note that an upper limit on the number of questions to output may also be imposed. In this case, the questions having a higher degree of association are prioritized for output. Furthermore, the user is made to select a question, and the selected question is received (step 207). Note that when outputting one or more questions, the degree of association may also be output at the same time. In addition, questions exceeding the threshold X may be color-coded or the like to emphasize the difference from questions whose degree of association is lower than the threshold X but higher than the threshold Y. In this case, the user is able to intuitively recognize questions having a high degree of association. Thereafter, the answer to the question selected by the user is output (step 208).

Figure 16A:
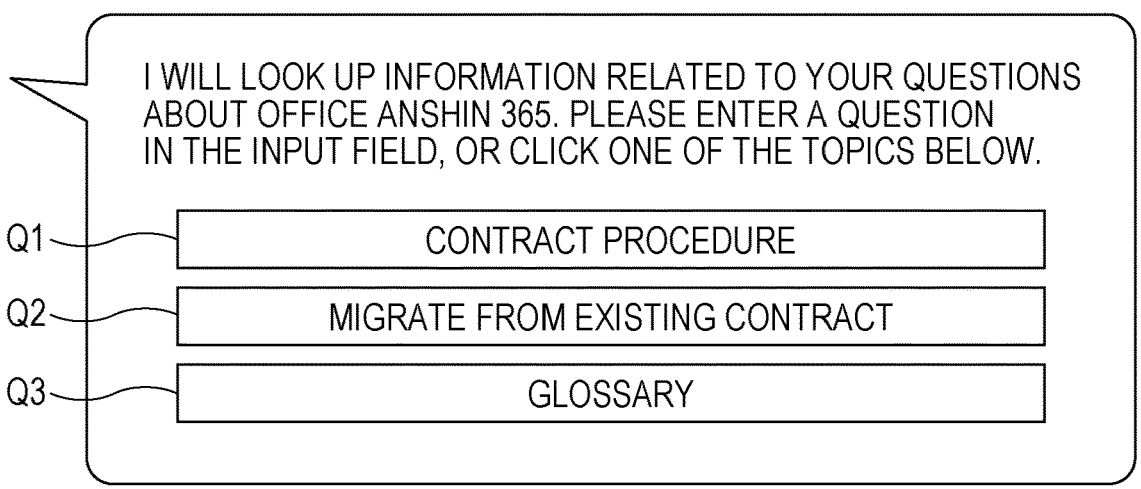
FIG. 16A is a diagram illustrating a greeting initially output by a chat bot when a user accesses the chat bot in step 201 of FIG. 14.

FIG. 16A is a diagram illustrating a greeting initially output by the chat bot when the user accesses the chat bot in step 201 of FIGS. 14. Q1 to Q3 illustrate cases of assisting the user with input by pre-presenting information such as components including questions commonly asked in inquiries, for example.

Figure 16B:
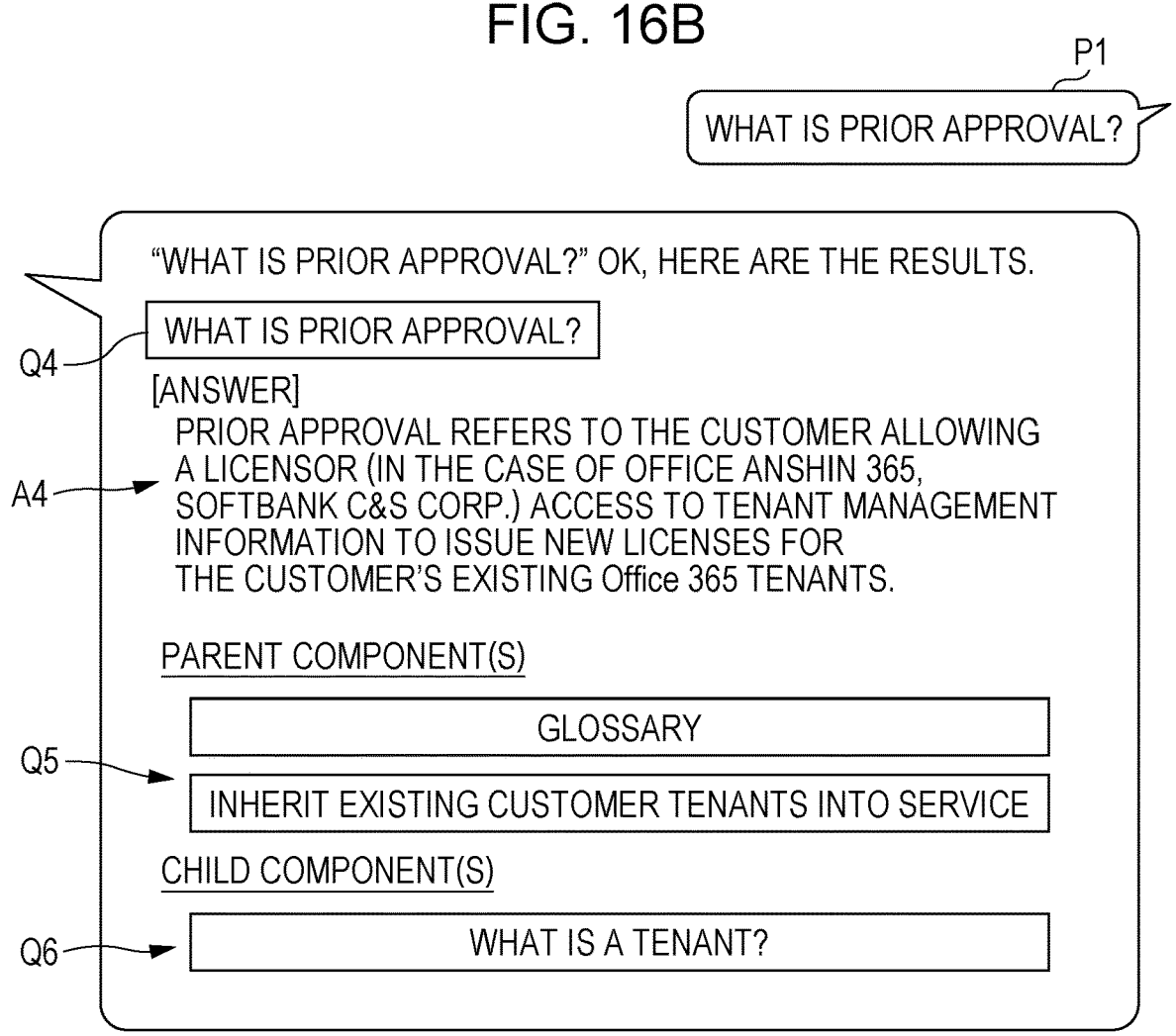
FIG. 16B is a diagram illustrating a screen outputting an answer to a question in a case where there is one question selected by the search engine for which the degree of association exceeds a threshold X.

FIG. 16B is a diagram illustrating a screen that output an answer to a question in the case where the selection unit 22 determines that there is one question whose degree of association exceeds the threshold Y and the degree of association exceeds the threshold X (the case of "One" in step 204 and "Exceeds" in step 205 of FIG. 14). This case illustrates an example in which the user makes an inquiry P1 asking "What is prior approval?", and there is one question whose degree of association exceeds the threshold Y and exceeds the threshold X (the case of "One" in step 204 and "Exceeds" in step 205 of FIG. 14). Specifically, "What is prior approval?" is output as the one question Q4. Subsequently, the output unit 24 outputs an answer A4 to the question.

Furthermore, in the exemplary embodiment, an answer to the selected question is output, while in addition, questions existing in a parent-child relationship with the question are also output. In this case, the two questions "Glossary" and "Inherit existing customer tenants into service" are displayed as questions Q5 of the parent component Ct. Also, "What is a tenant?" is displayed as a question Q6 of the child component Ct. In this way, by additionally presenting components Ct in a parent-child relationship, the nearby organization related to the output question and the organization of the whole may be presented together to the user. With this arrangement, the user is able to additionally select questions that better conform to the user's own inquiry, and convenience is improved.

Returning to FIG. 14, in the case where there is no question whose degree of association exceeds the threshold Y ("None" in step 204), a corresponding question is determined to be unavailable, and a predetermined answer is output (step 209). The answer is an answer for a component Ct of the inquiry window, for example.

Also, when the answer to the question is output in step 208, the user is also able to further select one of the questions Q5 of the parent component Ct or the question Q6 of the child component Ct as illustrated in FIG. 16B. In this case, the process in steps 207 and 208 are performed, and the answer to the question further selected by the user is output. Additionally, when the answer to the question is output in step 208, a new inquiry may also be received. In this case, the flow returns to step 202.

<Exemplary Modifications>
(Identification Assistance Column)

A configuration is also possible in which the table is further provided with an identification assistance column used when identifying a question, the selection unit 22 identifies a question on the basis of the degree of association between an index created from the identification assistance column and the inquiry, and the output unit 24 outputs an answer to the question. FIG. 17 is a diagram illustrating a table Tf provided with the identification assistance column. Compared to the table Ta of FIG. 6A, for example, items in an identification assistance column K are added to the table Tf illustrated in FIG. 17. The "identification assistance column" is a column stating content better suited to selecting when selecting a question with respect to a user inquiry. Additionally, by using an index created on the basis of the identification assistance column, the accuracy of selecting a question with respect to a user inquiry is improved. In addition, the identification assistance column may also be left blank. In this case, the question of the component Ct is not considered for selection. Therefore, by leaving the identification assistance column blank, it is possible to handle questions that are undesirable as output. Note that any number of identification assistance columns may be provided.

(Answer Types)

As a general rule, answers may be stated freely in any way. However, answers may also be classified into types, and the answers may be stated according to the type. A "type" refers to a predetermined format for stating an answer in the table. Additionally, predetermined formats for stating answers may be prepared as types, causing answers to be stated in accordance with the formats. With this arrangement, convenience is improved when stating answers. Also, the answer formats may be made consistent to avoid making the user feel a sense of unnaturalness.

(Application Examples of Map Mp)

Figure 18A:
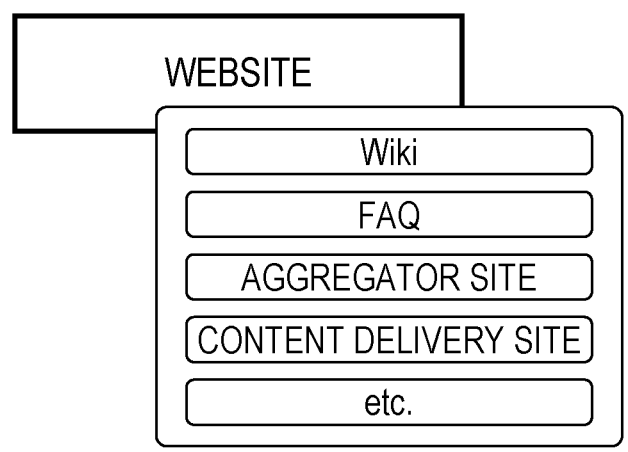
FIGS. 18A and 18B are diagrams illustrating other application examples of a map.
Figure 18B:
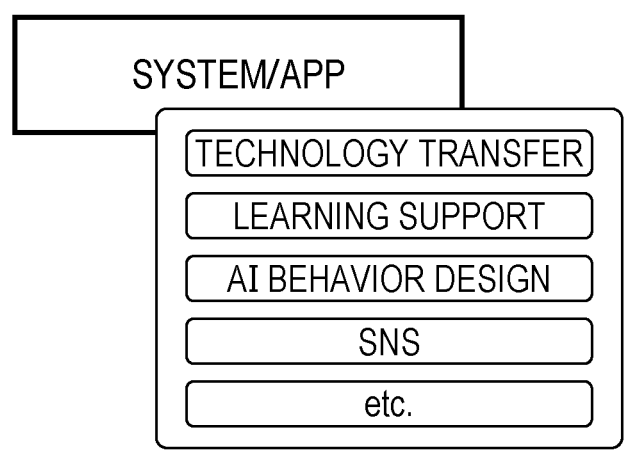

The example described above illustrates a case of applying the map Mp to a chat bot as the information processing apparatus 20, but the configuration is not limited thereto. FIGS. 18A and 18B are diagrams illustrating other application examples of the map Mp. Of these, FIG. 18A illustrates a case of applying the map Mp when creating a website. The website includes pages such as "Wiki", "FAQ", "Aggregator site", and "Content delivery site". Additionally, a map Mp is created for each of these pages to construct the configuration of the pages. It is also possible to utilize a map Mp for each page as content in which the components Ct of each page are organized into a tree structure.

Also, FIG. 18B illustrates a case of applying the map Mp when managing applications that run on a system. The system includes applications for organizing, systematizing, and deploying thoughts and ideas, such as "Technology transfer", "Learning support", "AI behavior design", and "SNS". Additionally, respective maps Mp are created to manage operations by each of the applications. Note that it is also possible to utilize a map Mp for each application as content in which the components of each application are organized into a tree structure Tree. In addition, pages and applications created by using these maps Mp may also be said to be capable of utilizing each other. As described earlier, these multiple maps Mp may be managed in the same table.

In cases like FIGS. 18A and 18B, a map Mp is created for every application, for example. The map Mp herein may also be referred to as an "application range map". In other words, multiple application range maps are prepared and managed for each application.

Additionally, in this case, it is also possible to receive a selection of a subset of components Ct in the tree structure Tree of a first map Mp, and connect the selected subset of components Ct to the tree structure Tree of a second map Mp, as described in FIGS. 5A and 5B. It may also be said that it is possible to designate a range for each application applying the created tree structures Tree and components Ct. Additionally, it may also be said that a selection of a subset of components Ct in a tree structure Tree of a first application range map among multiple application range maps is received, and the selected subset of components Ct is connected to a tree structure Tree in a second application range map.

Additionally, as described in FIG. 9, when there is a change in a parent-child relationship between components forming one of two structures Tree, a similar change is reflected in the other tree structure Tree, for example. It may also be said that when there is a change in a parent-child relationship between components forming a tree structure Tree among a tree structure Tree in a first application range map and a tree structure Tree in a second application range map, a change of only the parent-child relationship between the components connected between the application range maps is reflected in the tree structure Tree in the second application range map.

Also, like the case described in FIG. 9, it may also be said that when there is a change in the question and the answer to the question in a component forming one of a tree structure Tree in a first application range map and a tree structure Tree in a second application range map, a similar change is also reflected in the component Ct forming the other tree structure Tree.

(Other Method of Creating Table)

Figure 19A:
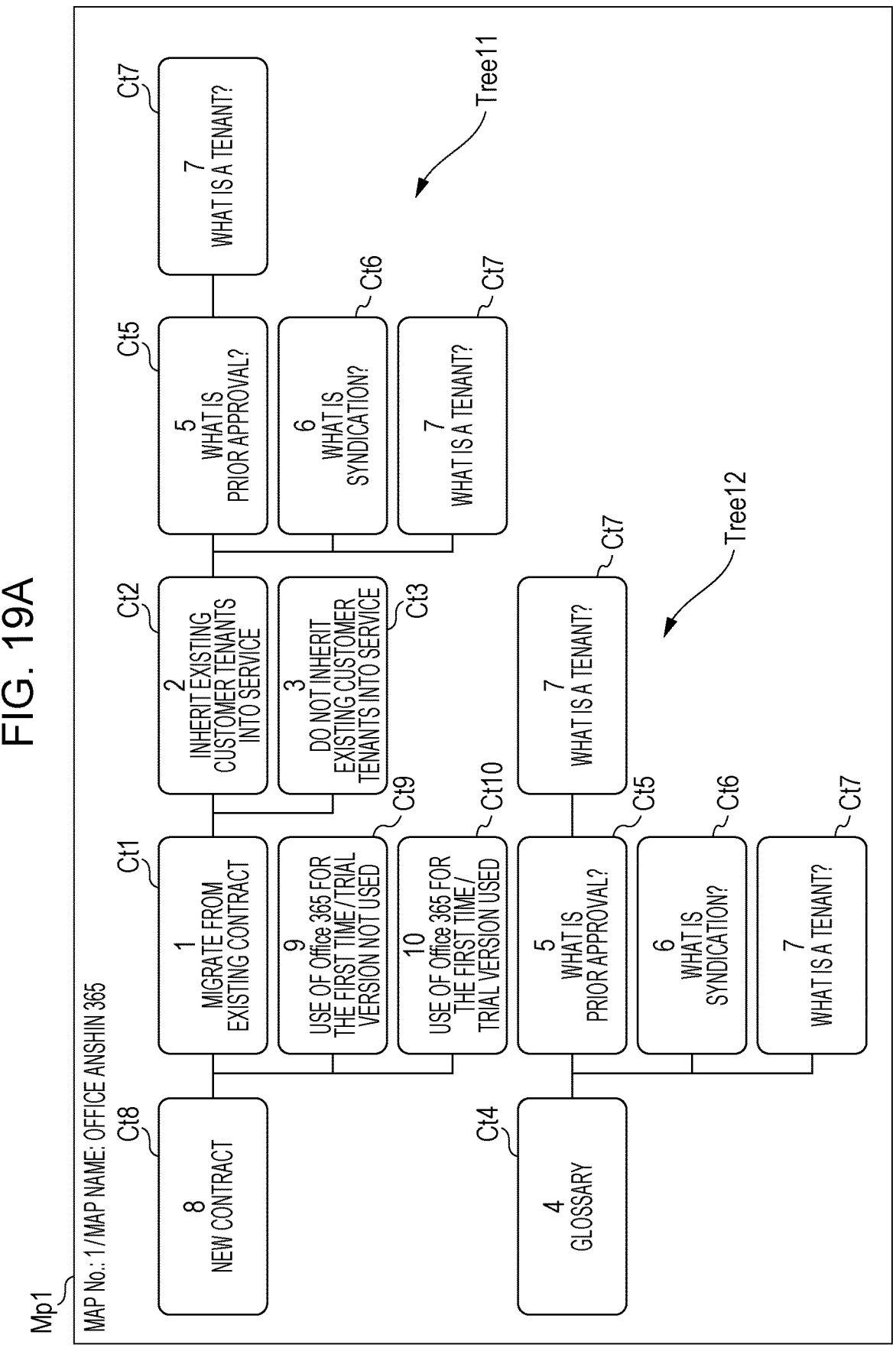

The example described above describes a case in which multiple tree structures Tree are managed in a single table, but multiple maps Mp including multiple tree structures Tree may also be managed in a single table. FIGS. 19A and 19B are diagrams illustrating a map Mp1 including tree structures Tree11 and Tree12, and a map Mp2 including tree structures Tree21 to Tree23. In other words, the case herein illustrates an example of multiple maps Mp including multiple tree structures Tree. Additionally, as illustrated in FIG. 19A, the tree structure Tree11 of the map Mp1 contains components Ct1 to Ct3 and Ct5 to Ct10, while the tree structure Tree12 contains components Ct4 to Ct7. On the other hand, as illustrated in FIG. 19B, the tree structure Tree21 of the map Mp2 contains components Ct11, Ct13 to Ct18, and Ct23. Furthermore, the tree structure Tree22 contains a component Ct12, and the tree structure Tree23 contains components Ct19 to Ct22.

FIG. 20 is a diagram illustrating a table Tg for creating the tree structures illustrated in FIGS. 19A and 19B. Compared to the tables described above, the two columns "Map No." and "Map Name" are added to the table Tg. Of these, "Map No." is an ID assigned to each map Mp. Also, "Map Name" is a name assigned to each map Mp. Additionally, Map No. may be used to identify which map Mp a component Ct belongs to, and the table Tb may be managed on the basis of the map Mp1 and the map Mp2.

FIGS. 21A and 21B are diagrams illustrating a case of dividing the table Tg into a table Th for creating the tree structures Tree11 and Tree12 included in the map Mp1 and a table Ti for creating the tree structures Tree21 to Tree23 included in the map Mp2. In other words, in the present embodiment, the information for creating the tree structures Tree11 and Tree12 belonging to the map Mp1 and the tree structures Tree21 to Tree23 belonging to the map Mp2 may be managed in the single table Tg as illustrated in FIG. 20 or in the two tables Th and Ti as illustrated in FIGS. 21A and 21B.

Figure 22B:
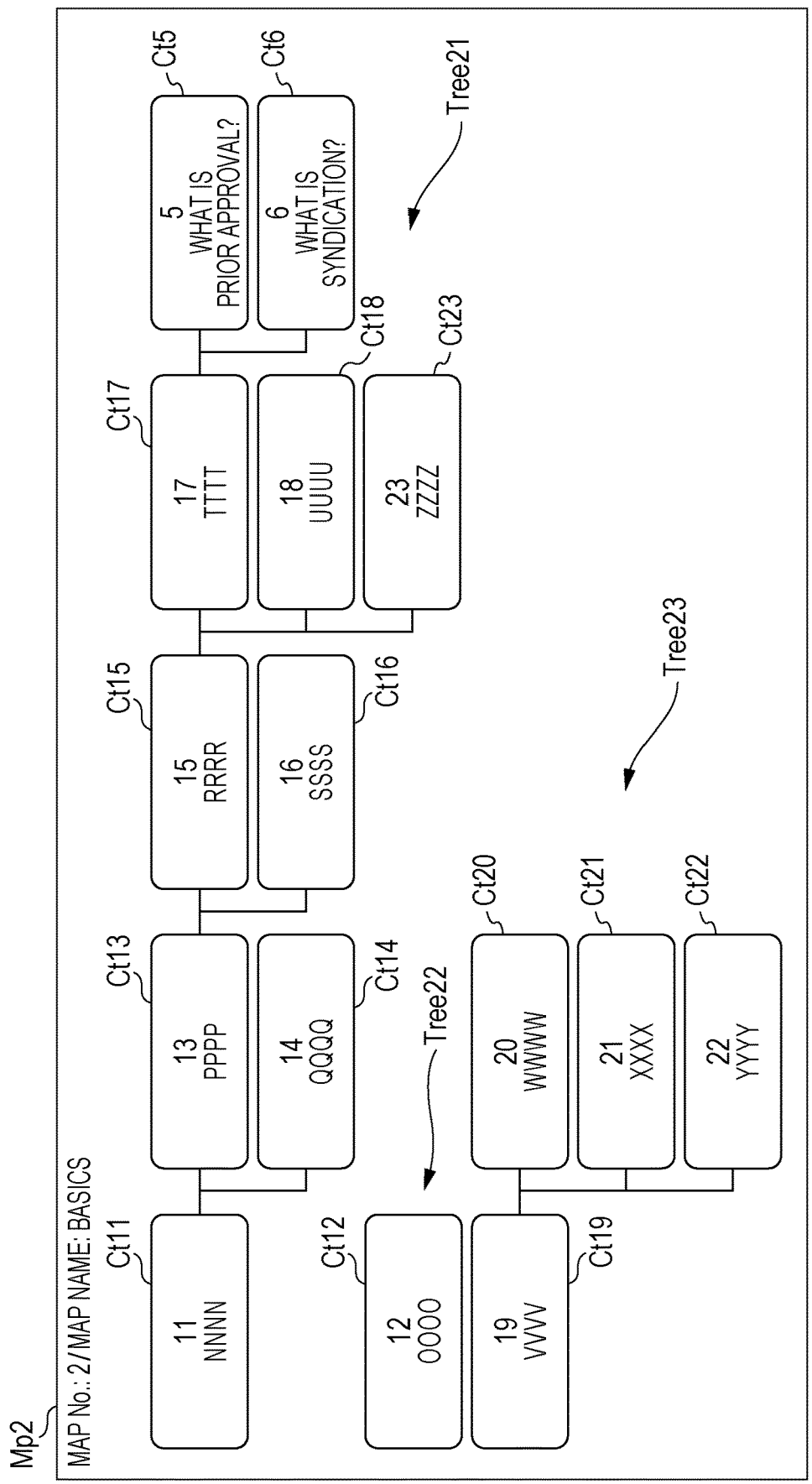

Also, FIGS. 22A and 22B are diagrams illustrating a case of connecting the components Ct5 and Ct6 in the map Mp1 of FIG. 21A to the tree structure Tree21 of the map Mp2 in FIG. 21B. In other words, a case is illustrated in which, from the state illustrated in FIGS. 21A and 21B, the components Ct5 and Ct6 in the tree structure Tree11 or the tree structure Tree12 are selected and connected as children of the component Ct17 in the tree structure Tree21. In this case, like the case described in FIG. 5B, the components Ct5 and Ct6 remain unchanged in the tree structure Tree11 or the tree structure Tree12. In other words, the components Ct5 and Ct6 are not moved from the tree structure Tree11 or the tree structure Tree12 to the tree structure Tree21, but rather copied and pasted so to speak.

FIG. 23 is a diagram illustrating a table Tj after parent-child relationships are changed by the operation described in FIGS. 22A and 22B. In this case, the table Tg in FIG. 20 is changed to the table Tj in FIG. 23. A comparison of the table Tg and the table Tj demonstrates that first, the "Child" column of the No. 17 component Ct17 is changed from "null" to "5, 6". In other words, this means that before the change, no child components Ct existed for the component Ct17, but after the change, the No. 5 and No. 6 components Ct5 and Ct6 are connected as children. Similarly, the "Parent" column of the No. 5 and No. 6 components Ct5 and Ct6 is changed from "4, 2" to "4, 2, 17". In other words, this means that before the change, only the No. 4 and No. 2 components Ct4 and Ct2 were the parent components Ct of the components Ct5 and Ct6, but after the change, the No. 17 component Ct17 is additionally connected as a parent. Also, the "Map No." column of No. 5 and No. 6 is changed from "1" to "1, 2". In other words, this means that before the change, the components Ct5 and Ct6 were used only in the map Mp1, but after the change, the components Ct5 and Ct6 are used in both the map Mp1 and the map Mp2.

FIGS. 24A and 24B are diagrams illustrating a table Tk and a table Tl after parent-child relationships are changed by the operation described in FIGS. 22A and 22B. In this case, the table Th and the table Ti in FIGS. 21A and 21B are changed to the table Tk and the table Tl in FIGS. 24A and 24B. A comparison of the tables Th and Ti to the tables Tk and Tl demonstrates that changes similar to those described in FIG. 23 are made. Also, No. 5 and No. 6 records are added to the table Tl. In other words, No. 5 and No. 6 are used in both the map Mp1 and the map Mp2, and therefore are entered into both the table Th and the table Ti.

Figure 25A:
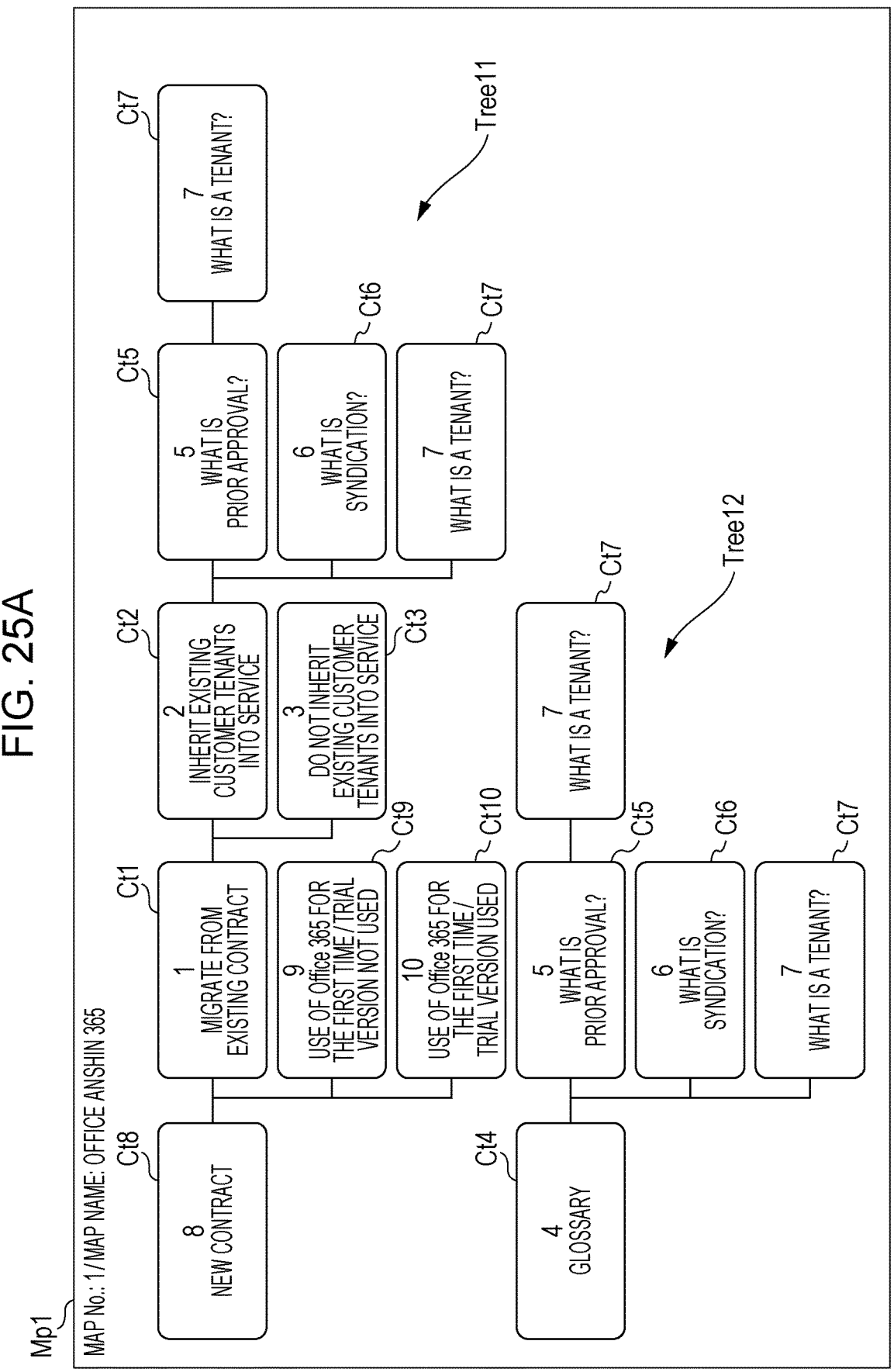
FIGS. 25A and 25B are diagrams illustrating a case of connecting components in one map in FIGS. 22A and 22B to the tree structure of another map.
Figure 25B:
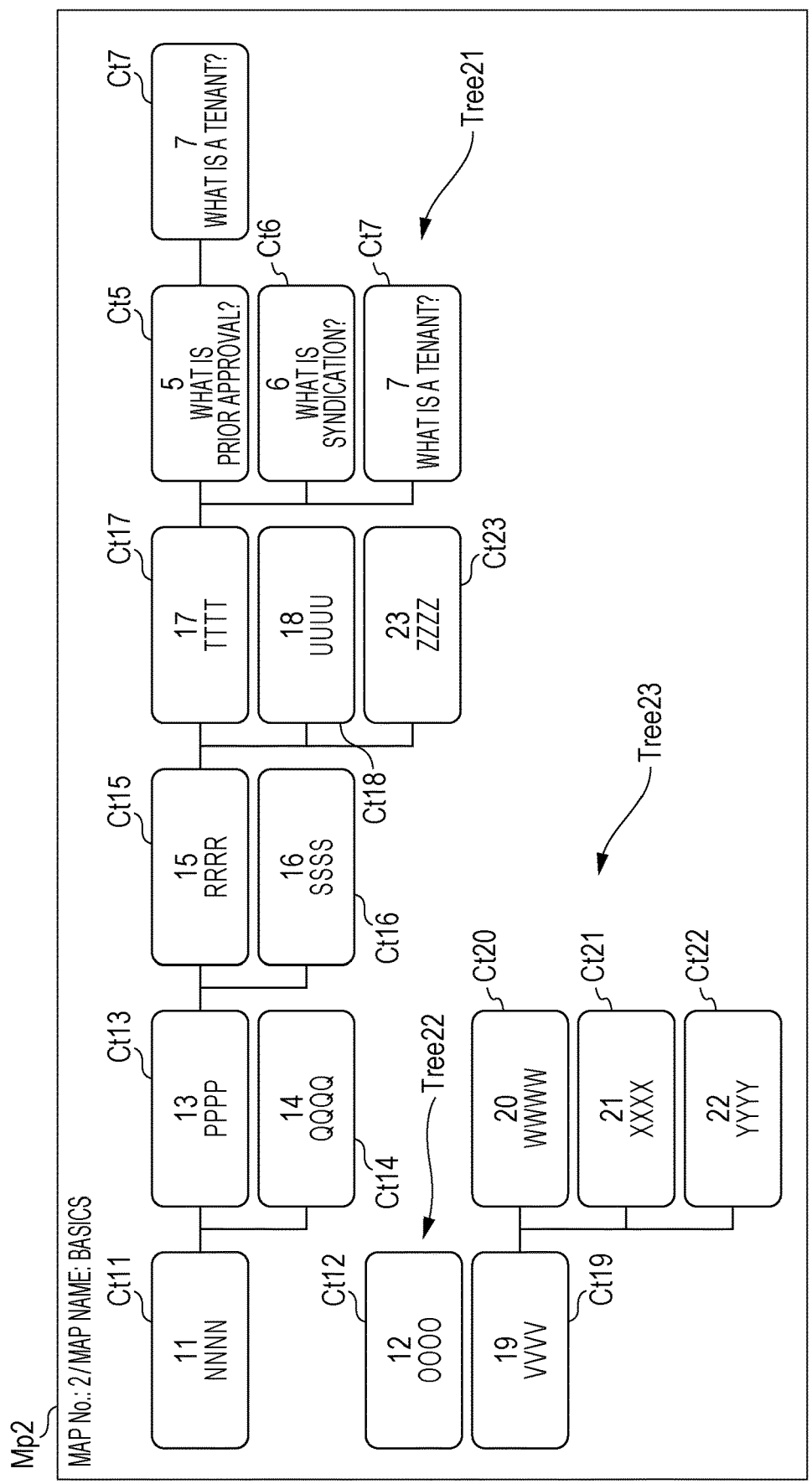

Furthermore, FIGS. 25A and 25B are diagrams illustrating a case of connecting the components Ct5 to Ct7 in the map Mp1 of FIG. 22A to the tree structure Tree21 of the map Mp2 of FIG. 22B. In other words, a case is illustrated in which, from the state illustrated in FIGS. 21A and 21B, the components Ct5 to Ct7 in the tree structure Tree11 or the tree structure Tree12 are selected and connected as children of the component Ct17 in the tree structure Tree21. Note that in this case, the component Ct7 is included twice. In this case, like the case described in FIG. 5B, the components Ct5 to Ct7 remain unchanged in the tree structure Tree11 or the tree structure Tree12.

FIG. 26 is a diagram illustrating a table Tm after parent-child relationships are changed by the operation described in FIGS. 25A and 25B. In this case, the table Tg in FIG. 20 is changed to the table Tm in FIG. 26. A comparison of the table Tg and the table Tm demonstrates that first, the "Child" column of the No. 17 component Ct17 is changed from "null" to "5, 6, 7". In other words, this means that before the change, no child components Ct existed for the component Ct17, but after the change, the No. 5 to No. 7 components Ct5 to Ct7 are connected as children. Similarly, the "Parent" column of the No. 5 to No. 7 components Ct5 to Ct7 is changed from "4, 2" to "4, 2, 17". In other words, this means that before the change, only the No. 4 and No. 2 components Ct4 and Ct2 were the parent components Ct of the components Ct5 to Ct7, but after the change, the No. 17 component Ct17 is additionally connected as a parent. Also, the "Map No." column of No. 5 to No. 7 is changed from "1" to "1, 2". In other words, this means that before the change, the components Ct5 to Ct7 were used only in the map Mp1, but after the change, the components Ct5 to Ct7 are used in both the map Mp1 and the map Mp2.

FIGS. 27A and 27B are diagrams illustrating a table Tn and a table To after parent-child relationships are changed by the operation described in FIGS. 25A and 25B. In this case, the table Th and the table Ti in FIGS. 21A and 21B are changed to the table Tn and the table To in FIGS. 27A and 27B. Like the case described in FIG. 26, a comparison of the tables Th and Ti to the tables Tn and To demonstrates that the "Child" column of the No. 17 component Ct17 is changed from "null" to "5, 6, 7". On the other hand, the "Parent" column of the No. 5 to No. 7 components Ct5 to Ct7 is not changed from "4, 2". In other words, it is not necessary to change the table Tn for creating the map Mp1. However, because the components Ct5 to Ct7 are used in the map Mp2, the "Map No." column of No. 5 to No. 7 is changed from "1" to "1, 2". Also, No. 5 to No. 7 records are added to the table To. Additionally, herein, the "Parent" column of No. 5 to No. 7 is "17", indicating that the parent of the components Ct5 to Ct7 is the component Ct17.

<Description of Program>

Herein, the processes performed by the map creation apparatus 10 and the information processing apparatus 20 according to the exemplary embodiment described above may be prepared as a program such as software, for example. Furthermore, the processes are achieved through the cooperation of software and hardware resources.

Therefore, in the exemplary embodiment, a program that executes the processes performed the map creation apparatus 10 may also be considered to be a program that causes a computer to achieve a display control function that associates components including questions and answers to the questions using parent-child relationships to control the display of the components as a tree structure, a connecting function that receives a selection of a subset of components in the tree structure according to a user operation and also connects the selected subset of components to the tree structure, and a changing function that changes the parent-child relationships of the components according to the connection.

Furthermore, the program that executes the processes performed by the information processing apparatus 20 may also be considered to be a program that causes a computer to achieve a reception function that receives an inquiry, a storage function that stores questions and answers to the questions in a predetermined table, and an output function that outputs an answer to the inquiry on the basis of the table, in which the table contains records including questions, answers to the questions, and information prescribing parent-child relationships for arranging the components including the questions and the answers into the tree structure, and records including the same components are stored in the same table.

Note that a program realizing an exemplary embodiment obviously may be provided via a communication medium, and may also be provided by being stored on a recording medium such as CD-ROM.

The above describes an exemplary embodiment, but the technical scope of the present disclosure is not limited to the scope described in the foregoing exemplary embodiment. It is clear from the claims that a variety of modifications or alterations to the foregoing exemplary embodiment are also included in the technical scope of the present disclosure.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information management apparatus comprising:
   a processor configured to
      associate components including questions and answers to the questions using parent-child relationships, and control a display of the components as a tree structure,
      receive a selection of a subset of components at a first position in the tree structure according to a user operation, and also connect the selected subset of components to a second position of the tree structure while the selected subset of components remain unchanged at the first position in the tree structure, and
      change the parent-child relationships of the components according to the connection of the components.

2. The information management apparatus according to claim 1, wherein
   the processor is capable of designating a range for each application applying a created tree structure and components.

3. The information management apparatus according to claim 2, wherein
   the processor manages a plurality of application range maps for designating the range for each application, and
   the processor receives a selection of a subset of components in a tree structure of a first application range map among the plurality of application range maps, and connects the selected subset of components to a tree structure tree in a second application range map.

4. The information management apparatus according to claim 3, wherein
   when there is a change in a parent-child relationship between components forming a tree structure from among a tree structure in the first application range map and a tree structure in the second application range map, the processor causes a change of only the parent-child relationship between the components connected between the application range maps to be reflected in the tree structure in the second application range map.

5. The information management apparatus according to claim 3, wherein
   when there is a change in the questions and the answers to the questions in the components forming a tree structure from among a tree structure in the first application range map and a tree structure in the second application range map, the processor causes a similar change to be reflected in the components forming a tree structure in the second application range map.

6. The information management apparatus according to claim 1, wherein
   the processor displays a plurality of tree structures, and
   the processor receives a selection of a subset of components in a first tree structure among the plurality of tree structures, and connects the selected subset of components to a second tree structure among the plurality of tree structures.

7. The information management apparatus according to claim 6, wherein
   when there is a change in a parent-child relationship between components forming one of a first tree structure and the second tree structure, the processor causes a similar change to be reflected in the second tree structure.

8. The information management apparatus according to claim 6, wherein
   when there is a change in the questions and the answers to the questions in the components forming one of the first tree structure and the second tree structure, the processor causes a similar change to be reflected in the components forming the second tree structure.

9. The information management apparatus according to claim 1, wherein
   the processor causes questions to be displayed in a tree structure.

10. The information management apparatus according to claim 9, wherein
    the processor causes the tree structure to be displayed together with a table for creating the tree structure.

11. The information management apparatus according to claim 1, wherein
    when the connection is made, the processor also changes the display of the table for creating the tree structure according to the connection.

12. A non-transitory computer readable medium storing a program causing a computer to execute a process for managing information, the process comprising:
    associating components including questions and answers to the questions using parent-child relationships, and controlling a display of the components as a tree structure;
    receiving a selection of a subset of components at a first position in the tree structure according to a user operation, and also connecting the selected subset of components to a second position of the tree structure while the selected subset of components remain unchanged at the first position in the tree structure; and
    changing the parent-child relationships of the components according to the connection.

* * * * *